(12) United States Patent
Gilbert et al.

(10) Patent No.: US 8,965,967 B2
(45) Date of Patent: Feb. 24, 2015

(54) TIE STRENGTH PREDICTION AND SOCIAL MEDIA FILTRATION

(75) Inventors: Eric Edmund Gilbert, Decatur, GA (US); Kyratso (Karrie) George Karahalios, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 616 days.

(21) Appl. No.: 12/976,601

(22) Filed: Dec. 22, 2010

(65) Prior Publication Data

US 2011/0167115 A1 Jul. 7, 2011

Related U.S. Application Data

(60) Provisional application No. 61/289,581, filed on Dec. 23, 2009.

(51) Int. Cl.
*G06F 15/16* (2006.01)
*G06Q 10/00* (2012.01)

(52) U.S. Cl.
CPC ....................................... *G06Q 10/00* (2013.01)
USPC ............................ 709/204; 709/205; 715/776

(58) Field of Classification Search
CPC ........................................................ H04L 51/32
USPC ........................................... 709/204; 715/776
See application file for complete search history.

(56) References Cited

U.S. PATENT DOCUMENTS

| | | | |
|---|---|---|---|
| 2009/0043844 A1* | 2/2009 | Zimmet et al. ............... | 709/204 |
| 2009/0070700 A1* | 3/2009 | Johanson ..................... | 715/776 |
| 2010/0030722 A1* | 2/2010 | Goodson et al. ............. | 706/54 |
| 2010/0161369 A1* | 6/2010 | Farrell et al. ................ | 705/8 |
| 2010/0228558 A1* | 9/2010 | Corcoran et al. ............ | 705/1.1 |

OTHER PUBLICATIONS

Adamic, Lada A., et al., "Friends and neighbors on the Web," *Social Networks* 25:211-230 (2003).
Albert, Réka, et al., "Statistical mechanics of complex networks," *Reviews of Modern Physics* 74(1):47-97 (Jan. 2002).
Bederson, Benjamin B., et al., "Pad++: A Zooming Graphical Interface for Exploring Alternate Interface Physics," *UIST* '94, pp. 17-26 (Nov. 1994).
Beenen, Gerard, et al., "Using Social Psychology to Motivate Contributions to Online Communities," *CSCW* '04, 6(3):212-221 (2004).
Bernard, H. Russell, et al., "The Problem of Informant Accuracy: The Validity of Retrospective Data," *Ann. Rev. Anthropol.* 13:495-517 (1984).
Bernstein, Michael, et al., "Collabio: A Game for Annotating People within Social Networks," *UIST* '09, 4 pages (Oct. 2008).

(Continued)

*Primary Examiner* — Glenford Madamba
(74) *Attorney, Agent, or Firm* — Bateman IP

(57) ABSTRACT

A computer-implemented method of predicting tie strength between persons within a social media network includes: modeling tie strengths between a user of the social media network and connected persons in the network as a combination of: a plurality of predictive variables, interactions between dimensions of the predictive variables, and network structure of the social media network; altering or filtering a stream of social media content from the connected persons using the tie strength as associated with the respective connected persons according to the modeling; and delivering the altered or filtered stream of social media content to a communications device of the user.

29 Claims, 13 Drawing Sheets

(56) References Cited

OTHER PUBLICATIONS

Boyd, Danah, "Faceted ID/Entity: Managing representation in a digital world," retrieved from http://www.danah.org/papers/Thesis.FacetedIdentity.pdf, 118 pages (Sep. 2002).
Burt, Ronald S., "Structural Holes and Good Ideas," *The American Journal of Sociology*, 110(2):349-399 (Sep. 2004).
Chopra, Sumit, et al., "Discovering the Hidden Structure of House Prices with a Non-Parametric Latent Manifold," *Proceeding in KDD '07 Proceedings of the 13th ACM SIGKDD*, 10 pages (2007).
Choudhury, Munmun De, et al., "Inferring Relevant Social Networks from Interpersonal Communication," *WWW* 2010, 10 pages (Apr. 2010).
Constant, David, et al., "The Kindness of Strangers: The Usefulness of Electronic Weak Ties for Technical Advice," *Organization Science*, 7(2):119-135 (1996).
Cosley, Dan, et al., "SuggestBot: Using Intelligent Task Routing to Help People Find Work in Wikipedia," *IUI '07*, pp. 32-41 (Jan. 2007).
Cunningham, William H., et al., "The Ipsative Process to Reduce Response Set Bias," *POQ* 41:379-384 (1977).
Fisher, Danyel, et al., "Using Social Sorting to Enhance Email Management," retrieved from http://www.connectedaction.net/wp-content/uploads/2010/04/2005-HCIC-Using-Social-Sorting-to-Enhance-Email-Management.pdf, *HCIC* Workshop, 10 pages (2006).
Fowler, James H., et al., "Dynamic spread of happiness in a large social network: longitudinal analysis over 20 years in the Framingham Heart Study," *BMJ* 337:a2338 (2008).
Friedkin, Noah, "A Test of Structural Features of Granovetter's Strength of Weak Ties Theory," *Social Networks* 2:411-422 (1980).
Gergle, Darren, et al., "The Impact of Delayed Visual Feedback on Collaborative Performance," *CHI 2006 Proceedings—Computer-Mediated Communication*, 1303-1312 (Apr. 2006).
Gilbert, Eric, "Computing Tie Strength," *CHI* 2009, 10 Pages (Apr. 2009).
Gilbert, Eric, et al., "The Network in the Garden: An Empirical Analysis of Social Media in Rural Life," *CHI* 2008, 10 pages (Apr. 2008).
Golder, Scott, et al., "Rhythms of social interaction: messaging within a massive online network," *Computers and Technologies*, 41-66 (2007).
Granovetter, Mark, "The Strength of Weak Ties: A Network Theory Revisited," *Sociological Theory*, 1:201-233 (1983).
Granovetter, Mark, "The Strength of Weak Ties," *American Journal of Sociology*, 78(6):1360-1380 (May 1973).
Greif, Irene, "Venturing into Social Software," *CTS '09*, 1 page (May 2009).
Grudin, Jonathan, "Why CSCW Applications Fail: Problems in the Design and Evaluation of Organizational Interfaces," *CSCW '88*, pp. 85-93 (1988).
Hansen, Morten T., "The Search-Transfer Problem: The Role of Weak Ties in Sharing Knowledge across Organization Subunits," *Administrative Science Quarterly*, 44(1):82-111 (Mar. 1999).
Haythornthwaite, Caroline, "Strong, Weak, and Latent Ties and the Impact of New Media," *The Information Society*, 18(5):385-401 (2002).
Haythornthwaite, Caroline, et al., "Work, Friendship, and Media Use for Information Exchange in a Networked Organization," *Journal of the American Society for Information Science*, 49(12):1101-1114 (1998).
Henderson, Jr., D. Austin, et al., "Issues in Message Technology," *SIGCOMM '77*, pp. 6-1 through 6-9 (1977).
Hogan, Bernard J., "Networking in Everyday Life," Dissertation, University of Toronto, 284 pages (2009).
Jaisen Mathai, "Twitter-async documentation," retrieved Mar. 15, 2011, from http://www.jaisenmathai.com/articles/twitter-async-documentation.html, 6 pages (2010).
Kahanda, Indika, et al., "Using Transactional Information to Predict Link Strength in Online Social Networks," *ICWSM '09*, pp. 74-81 (2009).
Kittur, Aniket, et al., "Beyond Wikipedia: Coordination and Conflict in Online Production Groups," *CSCW* 2010, pp. 215-224 (Feb. 2010).
Krackhardt, David, et al., "Informal Networks and Organizational Crises: An Experimental Simulation," *Social Psychology Quarterly*, 51(2):123-140 (Jun. 1988).
Lampe, Cliff, et al., "Changes in Use and Perception of Facebook," *CSCW '08*, pp. 721-730 (Nov. 2008).
Laumann, E.O., et al., "Monitoring the AIDS Epidemic in the United States: A Network Approach," *Science*, 44:1186-1189 (Jun. 1989).
Lazer, David, et al., "Computational Social Science," *Science*, 323:721-723 (Feb. 2009).
Liben-Nowell, David, et al., "The Link Prediction Problem for Social Networks," *CIKM '03*, pp. 556-559 (Nov. 2003).
Lin, Nan, et al., "Analyzing the Instrumental Use of Relations in the Context of Social Structure," *Sociological Methods & Research*, 7(2):149-166 (Nov. 1978).
Lin, Nan, et al., "Social Resources and Strength of Ties: Structural Factors in Occupational Status Attainment," *American Sociological Review*, 46(4):393-405 (Aug. 1981).
Ludford, Pamela J., et al., "Think Different: Increasing Online Community Participation Using Uniqueness and Group Dissimilarity," *CHI* 2004, 6(1):631-638 (Apr. 2004).
Marin, Alexandra, "Are respondents more likely to list alters with certain characteristics? Implications for name generator data," *Social Networks*, 26:289-307 (2004).
Marsden, Peter V., "Core Discussion Networks of Americans," *American Sociological Review*, 52(1):122-131 (Feb. 1987).
Marsden, Peter V., "Network Data and Measurement," *Annu. Rev. Sociol.* 16:435-463 (1990).
Marsden, Peter V., et al., "Measuring Tie Strength," *Social Forces*, 63(2):482-501 (Dec. 1984).
McPherson, Miller, et al., "Birds of a Feather: Homophily in Social Networks," *Annu. Rev. Sociol.*, 27:415-444 (2001).
Neustaedter, Carman, et al., "The Social Network and Relationship Finder: Social Sorting for Email Triage," *In Conference on E-mail and Anti-Spam*, 8 pages (Jul. 2005).
Newman, M.E.J., "Modularity and community structure in networks," *PNAS*, 103(23):8577-8582 (Jun. 2006).
Owens, David A., et al., "Technologies of Status Management: Status Dynamics in Email Communications," Forthcoming in *Research on Managing Groups and Teams*, JAI Press, vol. 3, pp. 1-37 (2000).
Pang, Bo., et al., "Thumbs up? Sentiment Classification using Machine Learning Techniques," *EMNLP '02*, vol. 10, 8 pages (2002).
Schaefer, Catherine, et al., "The Health-Related Functions of Social Support," *Journal of Behavioral Medicine*, 4(4):381-406 (1981).
Shi, Xiaolin, et al., "Networks of strong ties," *Physica A*, 378:33-47 (2007).
Uzzi, Brian, "Embeddedness in the Making of Financial Capital: How Social Relations and Networks Benefit Firms Seeking Financing," *American Sociological Review*, 64(4):481-505 (Aug. 1999).
Vandongen, Stijn Marinus, "Graph Clustering by Flow Simulation," Dissertation, University of Utretcht, pp. 1-173 (Sep. 1969).
Viégas, Fernanda B., et al., "Many Eyes: A Site for Visualization at Internet Scale," *IEEE Transactions on Visualization and Computer Graphics*, 13(6):1121-1128 (Nov. 2007).
Wellman, Barry, et al., "Different Strokes from Different Folks: Community Ties and Social Support," *American Journal of Sociology*, 96(3):558-588 (No. 1990).
Whittaker, Steve, et al., "The dynamics of mass interaction," *CSCW '98*, pp. 257-264 (1998).
Whittaker, Steve, et al., "ContactMap: Organizing Communication in a Social Desktop," *ACM Transactions on Computer-Human Interaction*, 11(4):445-471 (Dec. 2004).
Wu, Anna, et al., "Detecting Professional versus Personal Closeness Using an Enterprise Social Network Site," *CHI* 2010, pp. 1955-1964 (Apr. 2010).
Wuchty, Stefan, "What is a social tie?" *PNAS*, 106(36):15099-15100 (Sep. 2009).
Xiang, Rongjing, et al., "Modeling Relationship Strength in Online Social Networks," *WWW* 2010, pp. 981-990 (Apr. 2010).

* cited by examiner

500 # TIE STRENGTH PREDICTION AND SOCIAL MEDIA FILTRATION

REFERENCE TO EARLIER FILED APPLICATION

This application claims the benefit under 35 U.S.C. §119(e) of U.S. Provisional Patent Application No. 61/289,581, filed Dec. 23, 2009, which is incorporated herein, in its entirety, by this reference.

FEDERALLY SPONSORED RESEARCH

This invention was made with Government support under NSF Grant 0643502 by the National Science Foundation. The United States Government has certain rights in the invention.

TECHNICAL FIELD

The present disclosure relates to predicting tie strength with social media, and more particularly, to a server useable within a networked computer system that provides a filter and organizer to social media, which provides a stream of content according to relationships a person has with the people providing such content.

BACKGROUND

Social media treats all users the same: trusted friend or total stranger, with little or nothing in between. In reality, relationships fall everywhere along this spectrum, a topic social science has investigated for decades under the theme of tie strength.

Relationships make social media social. Yet, different relationships play different roles. Consider the recent practice of substituting social media friends for traditional job references. As one hiring manager remarked, by using social media "you've opened up your rolodex for the whole world to see." To the dismay of applicants, employers sometimes cold call social media friends expecting a job reference "only to find that you were just drinking buddies." Although clearly not the norm, the story illustrates a basic fact: not all relationships are created equal.

For decades, social science has made much the same case, documenting how different types of relationships impact individuals and organizations. In this line of research, relationships are measured in the currency of tie strength. Loose acquaintances, known as weak ties, can help a friend generate creative ideas or find a job. They also expedite the transfer of knowledge across workgroups. Trusted friends and family, called strong ties, can affect emotional health and often join together to lead organizations through times of crisis. Despite many compelling findings along this line of research, social media does not incorporate tie strength or its lessons. Instead, all users are the same: friend or stranger, with little or nothing in between. Most empirical work examining large-scale social phenomena agrees. A link between actors either exists or not, with the relationship having few properties of its own.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

DETAILED DESCRIPTION

Figure 1:
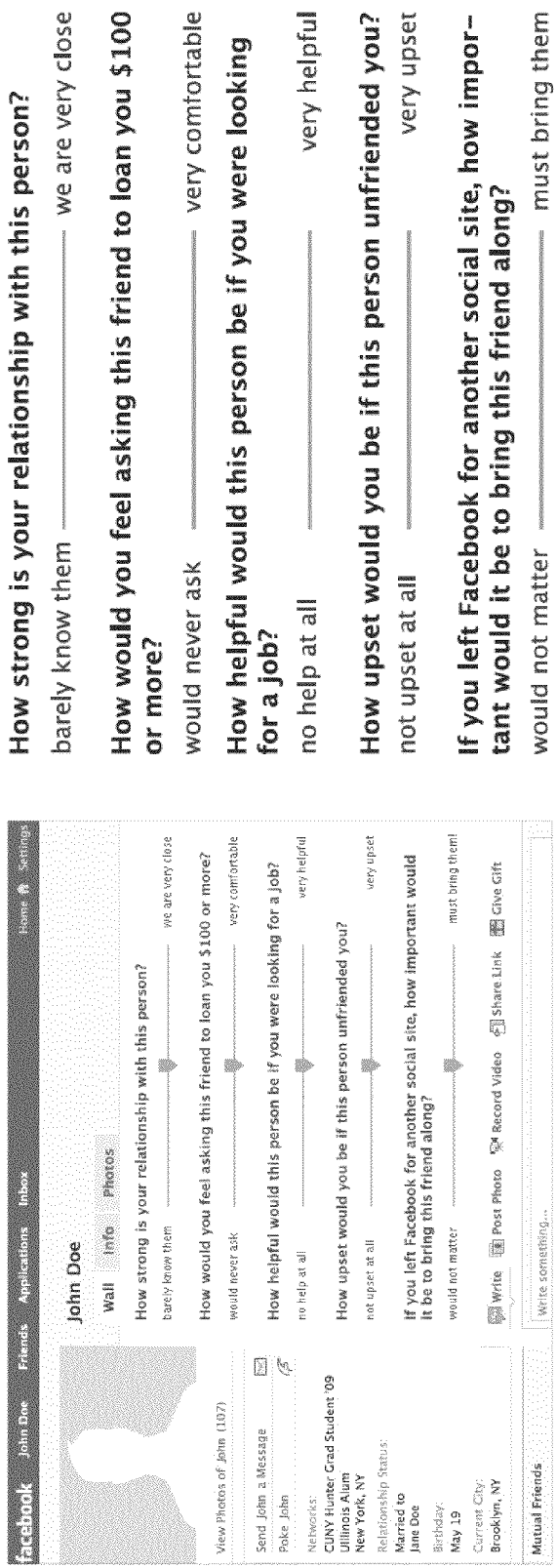
FIG. 1 is a screen shot of a Facebook page showing questions used to assess tie strength with a person, embedded into a profile of a friend of the person as a participant in a social network of that person.

By way of introduction, the present disclosure provides a model, including a number of dimensions and variables, for predicting tie strength between people within social media networks, generally referred to herein as the tie strength prediction model, or the prediction model, or simply "the model." The present disclosure further renders a web interface (We Meddle) of Twitter with the model to allow users to style and otherwise filter the Twitter stream of content according to desired tie strength and several other filtration criteria. Using the model, the web interface may also enable users to automatically create lists or groups of people, which includes a different means for browsing streams of social media.

This disclosure aims to bridge the gap, merging the theory behind tie strength with the data behind social media. With theory as a guide, can social media data predict tie strength? This is more than a methodological or theoretical point; a model of tie strength has the potential to significantly impact social media users. Consider automatically allowing the friends of strong ties to access your profile. Or, as one participant cleverly suggested, remaking Facebook's Newsfeed to get rid of "people from high school I don't give a crap about." The model presented builds on a dataset of over 2,000 Facebook friendships, each assessed for tie strength and described by more than 70 numeric indicators. It performs with surprising accuracy, modeling tie strength to 10-point resolution and correctly classifying friends as strong or weak ties more than 85% of the time.

First are reviewed the principles behind tie strength, and then discussed are its proposed dimensions. Using theory to guide the selection of predictive variables, the construction of the current tie strength model is presented. To understand limitations of the model, results are presented of follow-up interviews about the friendships the model had the most difficulty predicting. The applicants found that the tie strength prediction model generalizes to Twitter and will discuss this application in more detail after a discussion of application to Facebook. The applicants believe there is a 'signature' model for tie strength that exists in most social media.

Tie Strength

Mark Granovetter introduced the concept of tie strength in his landmark 1973 paper "The Strength of Weak Ties." Granovetter, M. S., The Strength of Weak Ties, *The American Journal of Sociology*, 78(6), 1360-1380 (1973). "The strength of a tie is a (probably linear) combination of the amount of time, the emotional intensity, the intimacy (mutual confiding), and the reciprocal services which characterize the tie." Id. While Granovetter left the precise definition of tie strength to future work, he did characterize two types of ties, strong and weak. Strong ties are the people you really trust, people whose social circles tightly overlap with your own. Often, they are also the people most like you. The young, the highly educated and the metropolitan tend to have diverse networks of strong ties. Weak ties, conversely, are merely acquaintances. Weak ties often provide access to novel information, information not circulating in the closely knit network of strong ties.

We usually trust our strong ties, and their social circles tightly overlap with our own. Often, our strong ties also share our values, tastes and interests, yet this effect diminishes for people who live in cities. Happiness even flows along strong ties in a network. Weak ties, on the other hand, are our acquaintances. Most notably, they provide access to new information, information not flowing through our dense networks of strong ties. For instance, scientific discoveries seem to flow more efficiently through weak ties than through strong ones. In a re-creation of a classic Milgram experiment, a researcher asked participants to deliver a booklet to some unknown person in a distant place. They found that people who used more weak ties in their paths had greater success reaching the destination. People with weak ties outside their organizations often command higher salaries and obtain better deals for their firms.

Many researchers have adopted tie strength as an analytic framework for studying individuals and organizations. Google Scholar, for instance, claims that over 7,000 papers cite "The Strength of Weak Ties." The social support offered by strong ties can actually improve mental health: when people with whom we have strong ties find happiness, we often find it, too. Banks that find the right mix of weak and strong ties to other firms tend to get better financial deals. It has also been shown that weak ties, as opposed to strong ones, benefit jobseekers. However, socioeconomic class reverses this effect: jobseekers from lower socioeconomic backgrounds often rely heavily on strong ties.

Strong ties between employees from different organizational subunits can help an organization withstand a time of crisis. Yet, strongly tied coworkers are also the ones likely to create crisis by pushing for institutional change. Employees who weakly tie themselves beyond organizational boundaries tend to receive better performance reviews and generate more creative ideas. Weak ties also act as a conduit for useful information in computer-mediated communication (CMC). However, weak ties often rely on a few commonly-available media, whereas strong ties diversify, communicating through many channels.

Dimensions of the Strength

Granovetter proposed four tie strength dimensions: amount of time, intimacy, intensity, and reciprocal services. Subsequent research has expanded the list. At what point is a tie to be considered weak? This is not simply a question for the methodologically curious because the theory makes a curvilinear prediction. We endeavored to determine how much each of the above four indicators count toward tie strength. At least one expert proposed that structural factors shape tie strength, factors like network topology and informal social circles. Others argue that providing emotional support, such as offering advice on family problems, indicates a stronger tie. Still others show that social distance, embodied by factors such as socioeconomic status, education level, political affiliation, race and gender, influence tie strength.

In theory, tie strength has at least seven dimensions and many manifestations. In practice, relatively simple proxies have substituted for it: communication reciprocity, possessing at least one mutual friend, recency of communication, and interaction frequency. By leveraging social media, participants no longer have to recall details about their friend's network; the disclosed model can take advantage of long friend lists and rich interaction histories. In this way, the model also overcomes the problem of retrospective informant accuracy. In addition, a tie strength model built from social media has the potential to feed back into social media, in ways that benefit its users.

Research Questions

The work above leads us to introduce two research questions: (1) The existing literature suggests seven dimensions of tie strength: Intensity, Intimacy, Duration, Reciprocal Services, Structural, Emotional Support, and Social Distance. As manifested in social media, can these dimensions predict tie strength? In what combination? (2) What are the limitations of a tie strength model based solely on social media?

Method

To answer these research questions, we recruited 35 participants to rate the strength of their Facebook friendships. The goal was to collect data about the friendships that could act, in some combination, as a predictor for tie strength. Working in the lab, researchers used the Firefox extension Greasemonkey to guide participants through a randomly-selected subset of their Facebook friends. The researchers randomly sampled participants' friends, which guards against those with large networks dominating the results. The Greasemonkey script injected five tie strength questions into each friend's profile after the page loaded in the browser. FIG. 1 shows how a profile appeared to a participant. Participants answered the questions for as many friends as possible during one 30-minute session. On average, participants rated 62.4 friends ($\sigma=16.2$), resulting in a dataset of 2,184 rated Facebook friendships.

Social media experiments often employ completely automated data collection. Researchers worked in the lab for two important reasons. First, all data was captured at the client side, after a page loaded at the request of the user. This allowed researchers to stay within Facebook's Terms of Service. More importantly, however, researchers asked participants to give us sensitive information: their relationship strengths plus personal Facebook data. Data was collected in the lab to protect the privacy of participants and to increase the accuracy of their responses.

Predictive Variables

Figure 15:
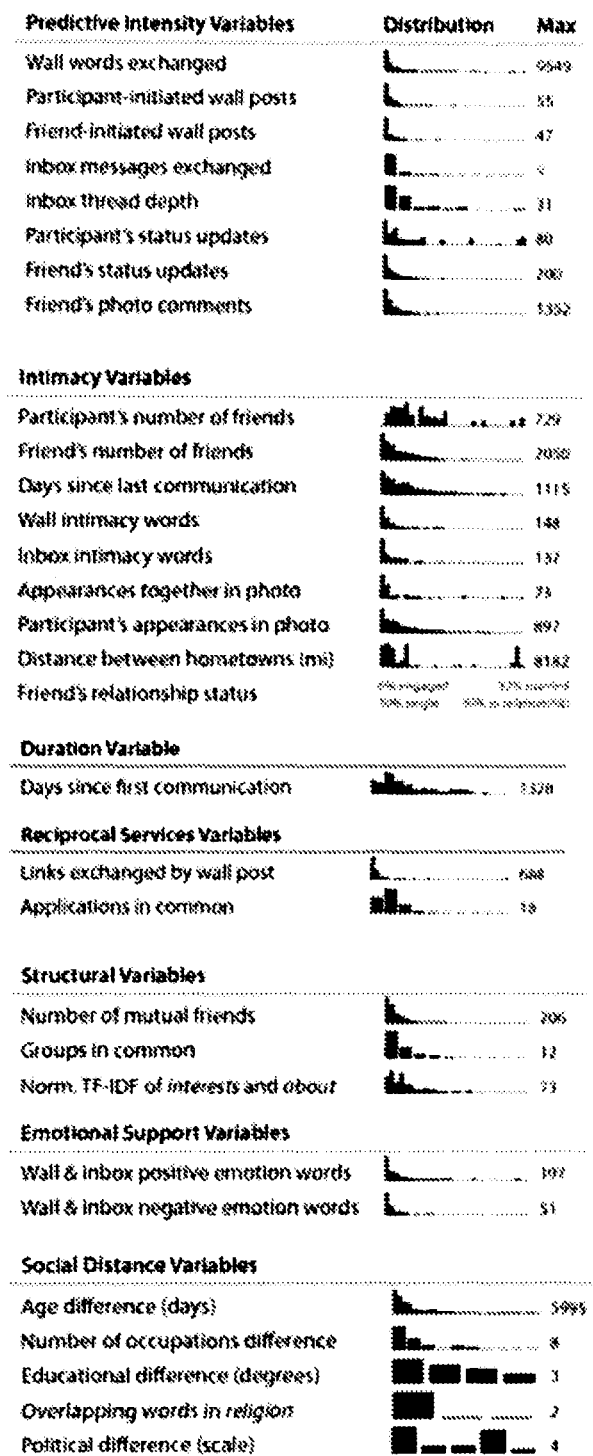
FIG. 15 is a chart presenting 32 tie strength variables along with their distributions.

While participants responded to the tie strength questions, the developed script automatically collected data about the participant, the friend and their interaction history. The tie strength literature reviewed in the previous section pointed to seven major dimensions of predictive variables. With these dimensions as a guide, researchers identified 74 Facebook variables as potential predictors of tie strength. FIG. 15 presents 32 of these variables along with their distributions. In choosing these predictive variables, researchers took advantage of Facebook's breadth while simultaneously selecting variables that could carry over to other social media. Below are clarified some variables listed in FIG. 15 and an explanation given for those not included in FIG. 15. All predictive variables make an appearance either in the text or in FIG. 15.

FIG. 15 displays thirty-two of over seventy variables used to predict tie strength, collected for each of the 2,184 friendships in the dataset. The distributions accompanying each variable begin at zero and end at the adjacent maximum. Most variables are not normally distributed.

Intensity Variables

Each Facebook user has a Wall, a public communication channel often only accessible to a friend of a user. Wall words exchanged refers to the total number of words traded between the participant and the friend via Wall posting. Inbox messages exchanged counts the number of appearances by a friend in a participant's Facebook Inbox, a private communication channel. Inbox thread depth, on the other hand, captures the number of individual Inbox messages sent between the pair. A helpful analogy for Inbox thread depth is the number of messages in a news group thread.

Intimacy Variables

To complement our aggregate measures, we used the Linguistic Inquiry and Word Count (LIWC) dictionary to perform content analysis. Pennebaker, J. W. and Francis, M. E., *Linguistic Inquiry and Word Count*, Lawrence Erlbaum (1999). The developed hypothesis was that friends of different tie strengths would use different types of words when communicating. LIWC matches text against lists of word stems assembled into categories. Wall intimacy words refer to the number of Wall words matching at least one of eleven LIWC categories: Family, Friends, Home, Sexual, Swears, Work, Leisure, Money, Body, Religion, and Health. Similarly, Inbox intimacy words refer to the number of Inbox words matching at least one of these categories. The Home category, for example, includes words like backyard and roommate, while the Work category includes busy, classes, and commute. In total, the intimacy variables checked for matches against 1,635 word stems. Although not presented in Table 1, each LIWC intimacy category was included as its own predictive variable.

Days Since Last Communication

Days since last communication measures the recency of written communication in some Facebook channel (Wall, Inbox, photo comments) from the day the data was collected.

Duration Variable

Researchers did not have access to the date when two people became friends. Instead, Days since first communication is a proxy for the length of the friendship. It measures time in the same way as Days since last communication.

Reciprocal Services Variables

Facebook friends have relatively few opportunities to exchange informational, social, or economic goods. These practices clearly differ by social media; consider a LinkedIn user who exploits his social capital by introducing business contacts to one another. To capture Reciprocal Services on Facebook, Links exchanged by wall post measures the number of URLs passed between friends via the Wall, a common Facebook practice. Similarly, Applications in common refers to the number of Facebook applications a participant and friend share. Facebook applications usually provide a tightly scoped service (e.g., displaying a virtual bookshelf on a profile) and often spread between friends by word of mouth.

Structural Variables

Facebook allows users to join groups organized around specific topics and interests. Groups in common refers to the number of Facebook groups to which both the participant and the friend belong. The term frequency-inverse document frequency (TF-IDF weight) is a weight often used in information retrieval and text mining that respects the baseline frequencies of different words in the English language. This weight is a statistical measure used to evaluate how important a word is to a document in a dataset or corpus. The importance increases proportionally to the number of times a word appears in the document but is offset by the frequency of the word in the dataset.

Normalized TF-IDF of interests and about measures the similarity between the free text interests and about profile fields. It does so by computing the dot product between the TF-IDF vectors representing the text. Also measured was Number of overlapping networks, the number of Facebook networks to which both the participant and the friend belong. Facebook networks often map to universities, companies, and geographic areas.

Emotional Support Variables

In a way similar to the content analysis variables described above, Wall & inbox positive emotion words are two variables referring to matches against the LIWC category Positive Emotion. The Positive Emotion category includes words like birthday, congrats, and sweetheart. Similarly, Wall & inbox negative emotion words are two variables counting matches in the Negative Emotion category, including words like dump, hate, and useless. Also recorded were the number of gifts given between a participant and a friend. A Facebook gift is a small icon often given to a friend to show support. Gifts sometimes cost a small amount of money.

Social Distance Variables

Researchers measured the difference in formal education between a participant and a friend in terms of academic degrees. It is computed by searching for the letters BS, BA, MS, MA, JD, MD and PhD in the education profile field. Educational difference measures the numeric difference between a participant and a friend along a scale: 0:None, 1:BS/BA, 2:MS/MA, and 3:JD/MD/PhD.

One thousand two hundred and one (1,261) people in our dataset completed the politics profile field. Of those, 79% reported their political affiliation as very conservative, conservative, moderate, liberal, or very liberal. Assigning a scale in that order, Political difference measures the numeric difference between a participant and a friend. While the education and politics scales do not completely reflect the diversity of our sample, they do provide useful tools for assessing the importance of these variables for the majority of it.

Demographic and Usage Variables

Finally, in addition to the variables described above, researchers collected demographic and usage information on participants and their friends: gender, number of applications installed, number of inbox messages, number of wall posts, and number of photo comments.

Figure 16:
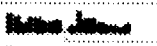
FIG. 16 is a chart presenting five questions used to assess tie strength, accompanied by their distributions.

FIG. 16 displays the five questions used to assess tie strength, accompanied by their distributions. The distributions present participant responses mapped onto a continuous 0 to 1 scale. The developed model predicts these responses as a function of the variables presented in FIG. 15.

Dependent Variables

Previous literature has proposed various manifestations of tie strength. To capture a diversity of views, researchers asked participants to answer five tie strength questions. Participants moved a slider along a continuum to rate a friend. FIG. 1 shows how those questions were embedded into a friend's profile. FIG. 16 illustrates the responses. A continuum was chosen instead of a discrete scale for three reasons. First, Mark Granovetter conjectured that tie strength may in fact be continuous. The literature has not resolved the issue, let alone specified how many discrete tie strength levels exist. A continuum bypasses that problem. Second, a continuum lends itself to standard modeling techniques. Finally, applications can round a predictions of a continuous model to discrete levels as appropriate.

Participants

The 35 participants used in the present research, primarily students and staff from the University of Illinois community, came from more than 15 different academic departments. The sample consisted of 23 women (66%) and 12 men (34%) ranging between 21 and 41 years old, with a mean and median of 26 years old. The minimum number of Facebook friends was 25; the maximum was 729 (with a median of 153). In terms of age and number of friends, previous empirical work suggests that the participants fall within the mainstream of Facebook users. All participants used Facebook regularly and had been members for at least one year.

Statistical Methods

Tie strength was modeled as a linear combination of the predictive variables, plus terms for dimension interactions and network structure:

$$s_i = \alpha + \beta R_i + \gamma D_i + N(i) + \varepsilon_i, \text{ where}$$

$$N(i) = \lambda_0 \mu_M + \sum_{k=2}^{4} \sum_{s \in M} \lambda_k (s - \mu_M)^k + \lambda_5 \min_M + \lambda_6 \max_M,$$

and where $M = \{s_j : j \text{ and } i \text{ are mutual friends}\}$.

More complex models were explored, but a (mostly) linear model allows researchers to take advantage of the full dataset and explain the results once it is built. In the equations above, $s_i$ represents the tie strength of the $i^{th}$ friend, $\alpha$ represents a constant determined by the standard least-squares minimization process, $R_i$ stands for the vector of 67 individual predictive variables, and $\beta$ is a weight coefficient discussed below. $\varepsilon_i$ is the error term. $D_i$ represents the pairwise interactions between the dimensions presented in FIG. 15. Pairwise interactions are commonly included in predictive models; in this case, including all pairwise interactions would force more variables than data points into the model. Instead, we nominated variables with the fewest missing values to represent each dimension. Not every participant or friend contributes every variable. $D_i$ represents all pairwise interactions between the 13 variables with a 90% or greater completion rate. Choosing 90% as a threshold ensured that every dimension was represented. Exploring the interactions between the dimensions of tie strength appears to be a unique approach.

Within the N(i) expression, the $\lambda$s are coefficients applied to those variables. The $\beta$ coefficients in Table 2 (below) correspond to these $\lambda$ values. N(i) encodes network structure. It captures the idea that tie strength of a friendship not only depends on its history, but also on the tie strengths of mutual friends. In other words, it models the concept that a friend who associates with your business acquaintances is different than one who knows your mother, brother, and sister. Since every friend has potentially-unique sets of mutual friends, the model uses seven descriptors of the tie strength distribution over mutual friends: mean, median, variance, skew, kurtosis, minimum, and maximum. These terms belong to the Structural dimension. However, N(i) introduces a dependency: every tie strength now depends on other tie strengths. One goal, therefore, is to incorporate the tie strengths of mutual friends despite the fact that it is tie strength of at least one of the friends we want to model in the first place. To reach this goal, the equations above are fit using an iterative variation of OLS (ordinary least squares) regression. In each iteration, the tie strengths from the previous round are substituted to calculate N(i), with all 5 initially set to zero. Note that N(i) is mostly linear in the predictive variables. Using the iterative variation of OLS regression, all $s_i$ converged in nine iterations (0.001 average relative change threshold). This approach parallels other "neighborhood effect" models.

While the above predictive model example is presented as a mostly linear model, a model including non-linear components is also envisioned, which although may include added complexities may also be more accurate in some respect. The adaptation of the method to be iterative and pairwise based on the use of regression techniques makes the model not strictly linear. One could refer to the model as a combination of linear and superlinear components, e.g., much faster than linear.

Researchers did not standardize, or "ipsatize," the dependent variables. Because network subsampling was employed, one could not be sure participants saw the Facebook friend they would rate highest or lowest. Furthermore, not all real-life friends have Facebook accounts. It is reasonable to assume that some participants would reserve the ends of the spectra for people our experiment would never turn up. Finally, to account for the violations of normality exhibited by the distributions in FIG. 15, every variable is log-transformed.

Results

Because each participant rated more than one friend, observations within a participant were not independent. This is a common obstacle for egocentric designs. To roughly adjust for it, all of the results presented here cut the degrees of freedom in half, a technique borrowed from the social networks literature.

On the first tie strength question, How strong is your relationship with this person?, the model fits the data very well: Adj. $R^2 = 0.534$, $p < 0.001$. $R^2$ is Pearson's coefficient of determination in the OLS technique, and is a standard measure of a model's fit to data. It roughly corresponds to the percentage of variance explained by the model. It is "adjusted" because the score incorporates a penalty for every predictive variable in the model. $R^2$ normally weakly increases in the number of predictors, so adding more to the model usually improves the model.

The model achieves a Mean Absolute Error (MAE) of 0.0994 on a continuous 0-1 scale, where 0 is weakest and 1 is strongest. In other words, on average the model predicts tie strength within one-tenth of its true value. This error interval tightens near the ends of the continuum because predictions are capped between 0 and 1. In addition, we found strong evidence of four dimension interactions (p<0.001): Intimacy×Structural, $F_{1,971}=12.37$; Social Distance×Structural, $F_{1,971}=34$; Reciprocal Services×Reciprocal Services, $F_{1,971}=14.4$; Structural×Structural, $F_{1,971}=12.41$. As demonstrated shortly, the Structural dimension plays a minor role as a linear factor. However, it has an important modulating role via these interactions. One way to read this result is that individual relationships matter, but they get filtered through a friend's clique before impacting tie strength.

Figure 2:
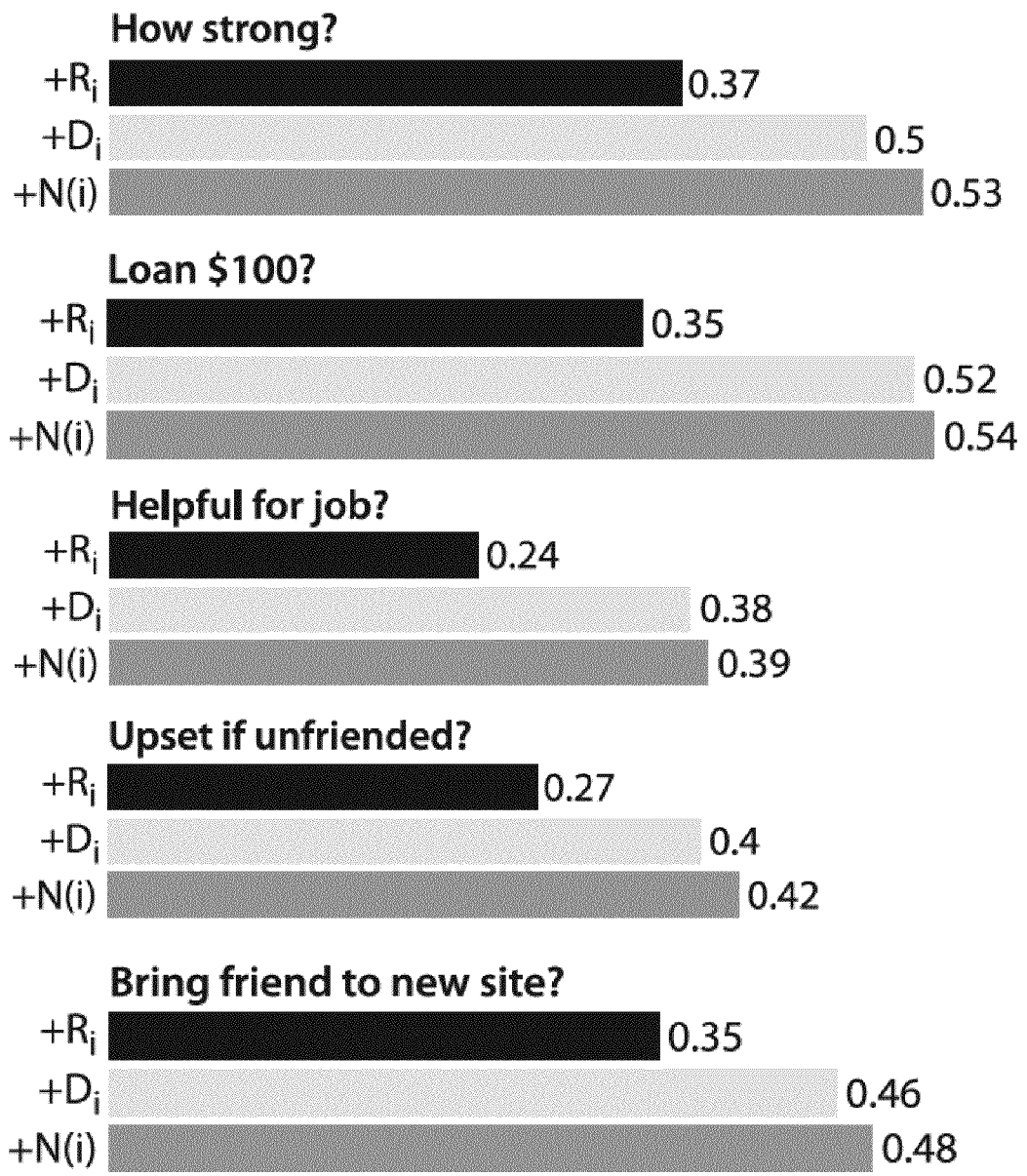
FIG. 2 is a set of bar graphs displaying adjusted $R^2$ values for all five dependent variables of a statistical model for tie strength adapted for Facebook, broken down by three main terms of the model.

FIG. 2 summarizes the performance of the developed model on all five tie strength questions, broken down by the three main terms of the model. Modeling dimension interactions boosts performance significantly, with smaller gains associated with modeling network structure. The model fits the second tie strength question as well as the first: How would you feel asking this friend to loan you $100 or more? However, it does not fit the last three questions as well: Helpful for job?, Upset if unfriended?, and Bring friend to new site?. The lower performance on these questions may have resulted from participant fatigue. We considered randomizing the questions for each friend to account for ordering effects like fatigue, but we feared that randomizing would confuse and frustrate our participants, contributing to lower accuracy across the board. Therefore, we chose to prioritize the first question, the most general of the five. With the exception of How helpful would this person be if you were looking for a job?, all dependent variable intercorrelations were above 0.5. See Table 3 below.

TABLE 1

| Correlations | Strong | Loan | Job | Un | Bring |
| --- | --- | --- | --- | --- | --- |
| Strong | 1 | 0.80 | 0.45 | 0.75 | 0.0 |
| Loan | 0.69 | 1 | 0.4 | 0.55 | 0.66 |
| Job | 0.45 | 0.4 | 1 | 0.5 | 0.46 |
| Unfriend | 0.75 | 0.55 | 0.5 | 1 | 0.74 |
| Bring | 0.7 | 0.55 | 0.46 | 0.74 | 1 |

Table 1 displays the inter-correlations of the five dependent variables. With the exception of Job-Strong, Job-Loan and Bring-Job, the dependent variables are well-correlated with one another.

Figure 3:
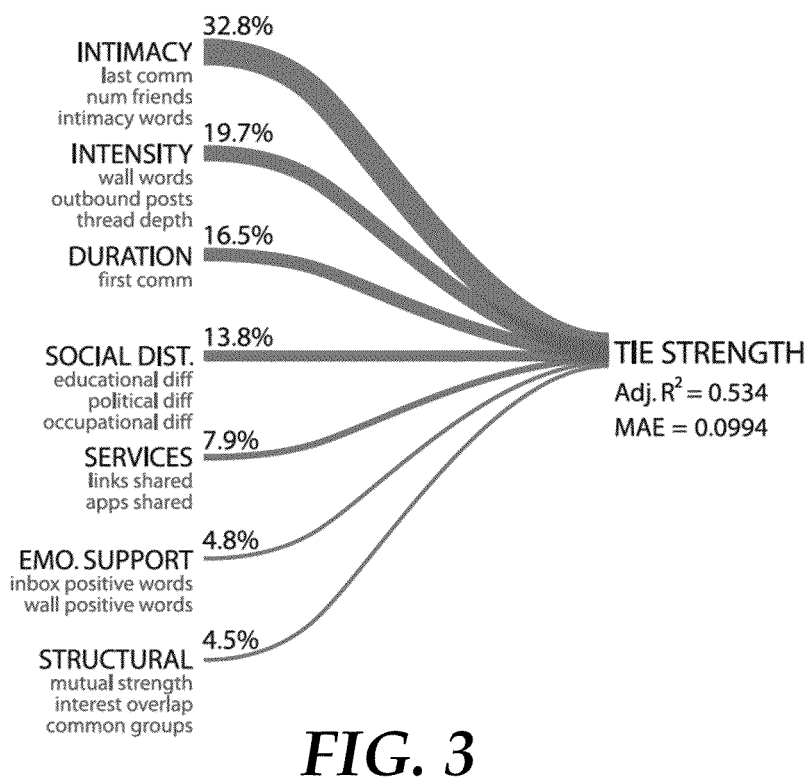
FIG. 3 is a graph indicating the predictive power of the seven tie strength dimensions, including the top one to three predictive variables for each, presented as part of the Facebook tie strength prediction model in which a weight of a dimension is computed by summing the absolute values of the coefficients belonging to the dimension.

FIG. 3 provides for the visualization of the predictive power of the seven tie strength dimensions as part of the Facebook tie strength prediction model. FIG. 3 also includes the top one to three contributing variables to each dimension. The weight of a dimension is calculated by summing the coefficients of the variables belonging to it. Although not uniformly distributed, no one dimension has a monopoly on tie strength.

TABLE 2

| Top 15 Predictive Variables | β | F | p-value |
| --- | --- | --- | --- |
| Days since last communication | −0.76 | 453 | <0.001 |
| Days since first communication | 0.755 | 7.55 | <0.001 |
| Intimacy × Structural | 0.4 | 12.37 | <0.001 |

TABLE 2-continued

| Top 15 Predictive Variables | β | F | p-value |
| --- | --- | --- | --- |
| Wall words exchanged | 0.299 | 11.51 | <0.001 |
| Mean strength of mutual friends | 0.257 | 188.2 | <0.001 |
| Educational difference | −0.22 | 29.72 | <0.001 |
| Structural × Structural | 0.195 | 12.41 | <0.001 |
| Reciprocal Serv. × Reciprocal Serv. | −0.19 | 14.4 | <0.001 |
| Participant-initiated wall posts | 0.146 | 119.7 | <0.001 |
| Inbox thread depth | −0.14 | 1.09 | 0.29 |
| Participant's number of friends | −0.14 | 30.34 | <0.001 |
| Inbox positive emotion words | 0.135 | 3.64 | 0.05 |
| Social Distance × Structural | 0.13 | 34 | <0.001 |
| Participant's number of apps | −0.12 | 2.32 | 0.12 |
| Wall intimacy words | 0.111 | 18.15 | <0.001 |

Table 2 presents the standardized beta coefficients of the top fifteen predictive variables. As a reminder, the beta coefficients are weights given to the predictive variables used in the OLS technique. The F statistics signify a variable's importance in the presence of the other variables. In other words, it is one way to estimate the amount of information a particular variable adds to the model controlling for every other variable. The two Days since last communication variables have such high coefficients due to friends that never communicated via Facebook. Those observations were assigned outlying values: zero in one case and twice the maximum in the other. In other words, the simple act of communicating once leads to a very large movement in tie strength. Educational difference plays a large role in determining tie strength, but that may reflect the university community from which we sampled participants. Curiously, Inbox thread depth has a negative effect on tie strength; the more messages friends exchange on a single topic, the lower their tie strength. Note that Table 4 orders the variables by their weights, or β coefficients, not their p-values. The p-value for Inbox thread depth does not express confidence in its coefficient; it expresses confidence in its utility relative to other variables. The coefficient confidence is greater than 99.9%. For example, Inbox thread depth is highly correlated with Inbox intimacy words, resulting in a lower F statistic.

Figure 4:
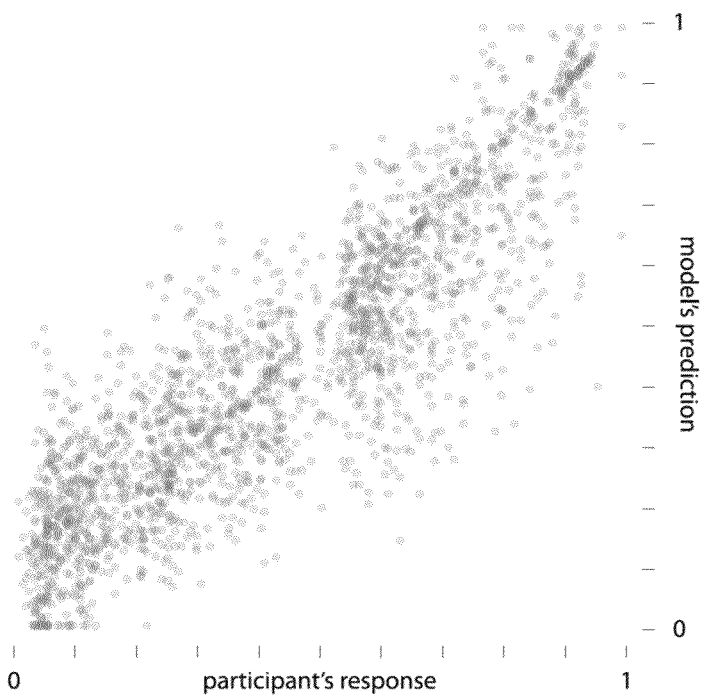
FIG. 4 is a graph showing performance of the Facebook tie strength model across all ties in a dataset used for the study.

FIG. 4 compares prediction of the Facebook model to participant responses across the entire dataset. FIG. 4 illustrates a strong correlation and another view on the MAE presented above. There is a strong correlation, yet the model shows a slight bias toward underestimation, represented as the larger cloud in the bottom-left of the Figure. The gap in the center results from the inclination of participants to move the slider from its starting pint, if only slightly. Discussed in the next session is the practical significance of the findings illustrated in FIG. 4, along with the discretization of tie strength.

Error Analysis Interviews

To understand limitations of the developed model, researchers conducted ten follow-up interviews about the friendships we had the most difficulty predicting. After identifying the friends with the highest residuals, we asked participants to tell us about this particular friendship, including anything that makes it special. For instance, one participant described a "friend" he barely knew:

I don't know why he friended me. But I'm easy on Facebook, because I feel like I'm somehow building (at least a miniscule amount of) social capital, even when I don't know the person.

We went to the same high school and have a few dozen common friends. We've never interacted with each other on Facebook aside from the friending.

Rating: 0; Prediction: 0.44.

Notice how the participant recalls that "he friended me." Although these friends had communicated via Facebook only twice (the participant mistakenly recalled "never"), the friend's clique confused the model. The friend came from a group of relatively strong friends. As mentioned earlier, the model filters individual relationships through cliques, leading to the high residual. Perhaps having deeper network knowledge could help, such as how the mutual friends see this friend. But this is beyond our ego-centric design.

Asymmetric Friendships

Two participants rated a friend highly because of how the friendship compared to others like it. In one case, a participant described a close bond with a professor:

This is a professor from one of the classes I TA-ed. We have a very good relationship, because in the past we have worked out a lot of difficult class problems. The professor still remembers my name, which for some of my 'friends' on Facebook may not be true. But not only that, she also knows how things are going at school, and when we meet in a hallway we usually stop for a little chat, rather than exchanging casual 'Hi! Hello!' conversation. Rating: 0.85; Prediction: 0.41.

Educational difference and the directionality of the wall posts pushed this prediction toward weak tie. Many people would not remark that a close friend "remembers my name." However, in the context of this participant's "networking" friends, the professor breaks the mold.

Responses of participants often revealed the complexity of real-life relationships, both online and offline. One participant grounded her rating not in the present, but in the hope of reigniting a friendship:

Ah yes. This friend is an old ex. We haven't really spoken to each other in about 6 years, but we ended up friending each other on Facebook when I first joined. But he's still important to me. We were best friends for seven years before we dated. So I rated it where I did (I was actually even thinking of rating it higher) because I am optimistically hoping we'll recover some of our "best friend"-ness after a while. Hasn't happened yet, though. Rating: 0.6; Prediction: 0.11.

Confounding the Medium

As might be expected, Facebook friends do not only stick to Facebook. One participant described a close friendship with a diverse digital trail:

This friend is very special. He and I attended the same high school, we interacted a lot over 3 years and we are very, very close. We trust each other. My friend and I are still interacting in ways other than Facebook such as IM, emails, phones. Unfortunately, that friend and I rarely interact through Facebook so I guess your predictor doesn't have enough information to be accurate. Rating: 0.96; Prediction: 0.47.

However, even friends that stick to Facebook sometimes do so in unexpected ways:

We were neighbors for a few years. I babysat her child multiple times. She comes over for parties. I'm pissed off at her right now, but it's still 0.8. ;) Her little son, now 3, also has an account on Facebook. We usually communicate with each other on Facebook via her son's account. This is our '1 mutual friend.' Rating: 0.8; Prediction: 0.28.

This playful use of Facebook clearly confused the model. With the exception of the Social Distance dimension, all indicators pointed to a weak tie. In fact, it is hard to imagine a system that could ever (or should ever) pick up on scenarios like this one.

Discussion

Our results show that social media can predict tie strength. The tie strength prediction model model predicts tie strength within one-tenth of its true value on a continuous 0-1 scale, a resolution probably acceptable for most applications. In other words, discretizing our continuum onto a 10-point Likert scale, the tie strength prediction model would usually miss by at most one point. The Intimacy dimension makes the greatest contribution to tie strength, accounting for 32.8% of the model's predictive capacity. This parallels P. V. Marsden's finding that emotional closeness best reflects tie strength. Marsden, P. V. and Campbell, K. E., Measuring Tie Strength, *Social Forces*, 63(2), 482-501 (1990). However, the Intensity dimension also contributes substantially to the model, contrasting with Marsden's finding that Intensity has significant drawbacks as a predictor. One way to explain this discrepancy is that the sheer number of people available through social media strengthens Intensity as a predictor. In other words, when you choose to interact with someone over and over despite hundreds of people from which to choose, it significantly informs tie strength. The number of variables representing each dimension also plays a role in its overall impact. For example, Emotional Support might impact tie strength more if more variables represented it. Emotional Support is particularly hard to quantify. However, more variables do not always equal greater impact. As Duration illustrates, a single variable can account for a large part of the predictive capacity of the model.

Some applications will not need 10-point resolution; the coarse categories of strong and weak may suffice. In "The Strength of Weak Ties," Granovetter himself performs his analytic work with only these approximate distinctions. One way to accomplish this is to use the model's mean, classifying all friends above it as strong and all below it as weak. Correct predictions are those where the participant's rating is correspondingly above or below the mean in the participant dataset. The tie strength prediction model classifies with 87.2% accuracy using this procedure, significantly outperforming the baseline, $X^2(1, N=4368)=700.9$, $p<0.001$. Note that this situation does not require more sophisticated evaluation techniques, like cross-validation, because the model is highly constrained and the threshold is not learned.

Some predictive variables were unexpected. For instance, Inbox thread depth negatively (and strongly) affects tie strength. This finding also clashes with existing work. Whittaker, et al. report that familiarity between Usenet posters increases thread depth. Whittaker, S., Terveen, L., et al., The Dynamics of Mass Interaction, *Proc. CSCW*, 257-264 (1998). One way to resolve this disparity is to note that there may be a fundamental difference between the completely private threads found on Facebook (essentially a variant of email) and Usenet's completely public ones. Common ground theory would suggest that strong ties can communicate very efficiently because of their shared understanding, perhaps manifesting as shorter Inbox threads. Educational difference also strongly predicts tie strength, with tie strength diminishing as the difference grows. This may have resulted from the university community to which our participants belonged. On the other hand, the result may have something to do with Facebook itself, a community that spreads especially well through universities. Some variables we suspected to impact tie strength did not. Number of overlapping networks and Age difference, while intuitively good predictors, made little appreciable difference to tie strength ($\beta=0027$, $F_{1,971}=3.08$, $p=0.079$ and ($\beta=-0.0034$, $F_{1,971}=10.50$, $p=0.0012$, respectively).

The error analysis interviews illustrate the inherent complexity of some relationships. They also point the way toward future research. A model may never, and perhaps should never, predict some relationships. Wanting to reconnect with an ex-boyfriend comes to mind. Relationships like these have powerful emotions and histories at play. However, it may be possible to make better predictions about relationships like the professor-student one, a strong relationship relative to others like it. Incorporating organizational hierarchy may also improve the ability of the system to reason about relationships like these. Merging deeper network knowledge with data about who extended the friend request also looks promising, as evidenced by the "he friended me" interview.

Practical Implications

Foreseen are many opportunities to apply tie strength modeling in social media. Consider privacy controls that understand tie strength. When users make privacy choices, a system could make educated guesses about which friends fall into trusted and untrusted categories. This might also depend on media type, with more sensitive media like photos requiring higher tie strengths. The approach would not help users set privacy levels for brand new friends, ones with whom there is no interaction history. Yet, it has two main advantages in that it adapts with time, and it establishes smart defaults for users setting access levels for hundreds of friends.

Or, imagine a system that only wants to update friends with novel information; broadcasting to weak ties could solve this problem. Consider a politician or company that wants to broadcast a message through the network such that it only passes through trusted friends. Because strongly tied friends often reconcile their interests, a politician might look for new supporters among the strong ties of an existing one. Limiting the audience of the message in this way may increase the success rate relative to the effort expended.

Social media has recently started suggesting new friends to users. However, sometimes we choose not to friend someone with good reason. For instance, a strong tie of a strong tie is not necessarily a friend at all: consider the beloved cousin of a best friend. Granovetter writes, "if strong ties A-B and A-C exist, and if B and C are aware of one another, anything short of a positive tie would introduce a 'psychological strain' into the situation." A system that understands tie strength might avoid "strain" by steering clear of these delicate situations. In fact, weak ties of existing friends may make better friend candidates, as it is less likely that users have already declined to friend them. More broadly, systems that understand tie strength might apply it to make better friend introductions, although deeper study would need to uncover how best to use it in this context.

Recent work suggests that the average number of social media friends continues to grow, currently above 300. With users keeping so many friends, social media has started to consolidate friend activity into a single stream. Facebook calls this the Newsfeed. However, the multiplicative nature of the types of friends crossed with the types of updates, e.g., photos, status, new friends, comments, etc., presents a difficult design problem. A system that prioritizes via tie strength, or allows users to tune parameters that incorporate tie strength, will likely provide more useful, timely, and enjoyable activity streams.

Theoretical Implications

There is still more variance to understand. Certainly, more predictive variables could help, such as "behind-the-scenes" data like who friended who. However, throwing more data at the problem might not solve it; perhaps social media needs novel indicators. This raises new questions for theory. When modeling tie strength exclusively from social media, do we necessarily miss important predictors? What is the upper limit of tie strength predictability?

In way of contribution toward answering the above questions, we first defined the importance of the dimensions of tie strength as manifested in social media. We sowed that these weights often do not align with prior work. Second, we showed that tie strength can be modeled as a continuous value. Third, our findings reveal how the Structural dimension modulates other dimensions by filtering individual relationships through cliques. Previously, it was not well-understood how or if tie strength dimensions interacted.

Finally, we see a home for our results in social network analysis. Most work to date has assumed a present link or an absent link, omitting properties of the link itself. Introducing a complete tie strength model into social network analyses, perhaps even joining a social media model with real-world data, may enable novel conclusions about whole systems.

Social Media Filtration Tool—We Meddle

In the remainder of this disclosure is presented a new social stream client called We Meddle, executable on a web-enabled computing device for filtering Twitter stream content. The application aims to soften the blow of the collapsed context problem, the collision of social circles that would normally remain separate in real life. We Meddle revolves around a computational model of tie strength, allowing users to render a stream according to their relationships with the people in it. We call the interface technique social zooming.

Imagine yourself in a room with everyone you have ever met, perhaps at your wedding reception as you stand in the receiving line greeting them. These people may include: your mother, your lab partner from high school, one or more ex-girlfriends, your spouse, your boss, an old roommate who never did the dishes, and on and on. Now, throw in some people you do not know at all, like famous athletes, TV personalities, models, etc. They all want to talk to you. And you would like to talk to them. This is, more or less, the state of social media streams today. As you might imagine, it has problems. First, everybody sees the same you. Are you the same person at work, at home and in public? Danah Boyd has termed this the collapsing of context, mostly writing about it from the perspective of self-presentation. Boyd, D., Faceted Id/entity: Managing Representation in a Digital World. Cambridge, Mass.: MIT Master's Thesis (2002). But it has another consequence as well. In social streams, all these wildly different people come to you through one channel, in temporal order, with nothing distinguishing one from any other.

In other words, if you want to monopolize the channel, just write about what you're eating, seeing or doing every ten minutes. Set in the context of Twitter, this might mean that a movie star's incessant tweeting obscures the one gem your best friend writes a week. In the real world, and even with varied media, we can easily enforce boundaries: turn on the TV to hear about the movie star; or pick up the phone to talk to your best friend. Today's social streams make this much harder. The remainder of this disclosure introduces a technological solution to soften the blow of the collapsed context problem: a new Twitter client termed as We Meddle.

We Meddle automatically infers tie strength between you and the Twitter users you follow. In We Meddle, users can emphasize strong ties or weak ties, depending on their viewing preferences at the moment. The site carefully maps the tie strength model disclosed above for use on Facebook onto Twitter. Extending the work of Fisher et al., We Meddle uses social history to render its interface. See Fisher, D., Hogan, B., et al., Using Social Sorting to Enhance Email Management, *Proc. HCIC* (2006). We Meddle, however, is the first social application we know of to put a calibrated relational model at the heart of its design. The different types of people in our lives provide different services to us. To mimic this, We Meddle lets users do things like "only show me weak ties who posted a link" and "emphasize strong ties who said something positive." In its first ten days on the web, and with minimal advertising, over 80 people have used We Meddle in the U.S., South America, and Australia.

We Meddle is a social stream client currently instantiated as a Twitter client. We have taken We Meddle to the web, an approach IBM Research calls Venture Research. Greif, I., Venturing into social software, Proc. CTS '09: *Proceedings of the* 2009 *International Symposium on Collaborative Technologies and Systems*, xiv+(2009). IBM also carried out one of its largest examples of internet-based research to date. Wattenberg, M., Kriss, 1., et al., ManyEyes: a Site for Visualization at Internet Scale, *IEEE Transactions on Visualization and Computer Graphics,* 13(6), 1121-1128 (2007).

Figure 5:
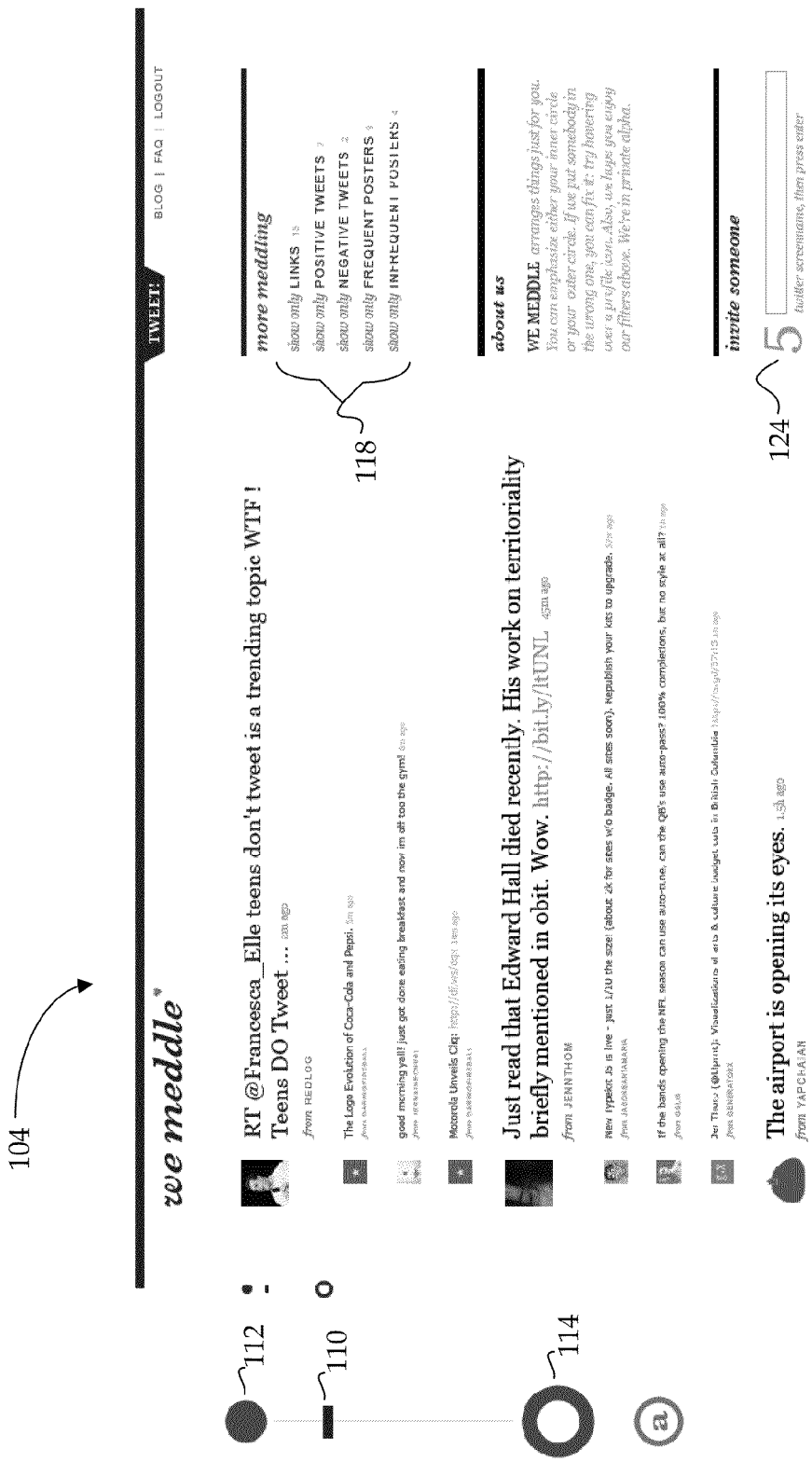
FIG. 5 is a screen shot of a socially zooming, graphical user web interface for a client tool (We Meddle) that renders a Twitter stream of a user with an underlying computational model of tie strength, to include certain filters, to deliver only content matching a certain level of tie strength and filtration criteria.

Live on the web, We Meddle accepts new users by invitation (from existing users) and rendering Twitter streams. FIG. 5 shows a graphical user, web interface 104 of We Meddle, for which there are near-term plans for desktop and mobile clients. We Meddle makes use of an underlying predictive model of tie strength to render its interface. We Meddle supports Twitter streams and may be adapted to support other social media streams such as from Facebook, LinkedIn, and the like. We Meddle creates streams based on tie strength and other cluster effects. It predicts groups or lists of people: examples include strong ties, weak ties, work ties, family, research and the like. It creates these groups and allows the user to label them.

Twitter Study—Proof of Generalization to Social Media

Simultaneously an experiment and a real-world system, we built the We Meddle site to determine whether predicting tie strength generalizes to another social media site, particularly one where intuition may suggest substantially different dynamics, and to determine if the model can solve social media design problems. We Meddle's central feature is that it infers tie strength between you and everyone you follow on Twitter, quickly generating exportable lists based on tie strength. Our results indicate that computing tie strength helps real users cope with the collapsed context problem, the collapse of everybody you know into a single stream. One We Meddle user tweeted that the site makes sure "important friends won't be buried in an ocean of other tweets." After analyzing We Meddle's 150,000 tie strength predictions, we also conclude that the tie strength prediction model generalizes to new social media. This finding suggests that a core property of online relationships may manifest similarly across social media.

There are many reasons to care about tie strength, but until recently, simple heuristics have substituted for it. Communication reciprocity, one mutual friend, communication recency, and interaction frequency have all stood in for tie strength at one time or another. New research claims that we severely skew analyses when we use coarse heuristics like these, and leading scholars have called for more refined metrics. Our data support these claims: we estimate that a heuristic like "call it a strong tie if they message each other at least N times" performs at 61% accuracy, at best, on a strong vs. weak classification task, with a baseline of 52%. Richer computational models, like the one presented earlier herein, perform with nearly 90% accuracy on the same task. We re-appropriate the earlier-presented model, a computational technique for predicting tie strength from 74 Facebook interaction variables, because it embraces simplicity as a path to generalizability and a rich set of predictors. We put both properties to work when we move it from Facebook to Twitter.

With this work, we ask if tie strength has a recognizable signature in social media, perhaps irrespective of a medium's implementation details. The disclosed tie strength prediction model works on the open interne. By putting our work on the open web, we lift sampling frame problems, encounter unexpected contexts and collect enough data to test theory. We Meddle is the first application we know of to put a relational model at the heart of its design, as opposed to something defined in a single medium (such as Facebook pokes that are unique to only Facebook). With a model calibrated against a large relational dataset, we expect to receive improved satisfaction scores from users regarding the level of tie prediction of the model. The system we present herein groups Twitter or other social media accounts together, and focuses on subtracting mispredictions, rather than adding each friend individually. We Meddle wants users to do as little work as possible, and thus seeks to analyze friends and multiple relational interconnections as a whole.

Method Overview and Research Questions

To test the generalizability and usefulness of predicting tie strength, We Meddle running on the disclosed system was made open to anyone on the interne who uses Twitter. Users sign in and have the tie strength model applied to their own Twitter accounts. We built We Meddle to attract users while generating data that answer social science research questions such as:

R1: Does the computational tie strength prediction model disclosed earlier herein, trained on Facebook data, generalize to another medium?

R2: Can computing tie strength help solve social media design problems, particularly ones introduced by the collapsed context problem?

R3: Can feedback from users improve the model? If so, how does it change?

Early Adoption Statistics

We only very-minimally promoted We Meddle in one tweet and one message to an academic mailing list. We offered no compensation. If users so choose, presumably because they like We Meddle, they can invite up to five other people in an invitation box 124 on the web interface 104 of FIG. 5. In fact, the currency of invitations seemed to work in our favor, subtly conveying worth and scarcity. In its first ten days, over 80 people signed into We Meddle, the majority via referrals from other users. We have seen over 250 unique page views by logged-in users, with users sending over 120 invitations. The top-level page has recorded over 600 unique visits. While this is quite small by web standards, it is very large by user study standards.

Twitter and Tie Strength

We named our application "We Meddle" because, well, it's nosy. When a user first signs in, an agent uses the Twitter API (apiwiki.twitter.com) to dig deeply through their history, trying to learn valuable lessons. Specifically, we apply the model disclosed earlier, including the various prediction variables, to every Twitter account a user follows. However, first we had to map the tie prediction model from Facebook onto Twitter. As shown in Table 5, we naively dropped the coefficients from the Facebook-specific tie strength prediction model right onto Twitter. This was one of our goals: identify predictors that draw on the breadth of Facebook, but have analogs in other social media. With one exception explained below, the model remains the same. The coefficients of the Twitter model differ in absolute terms from the Facebook prediction model because the Twitter model only uses the top predictors. Semantically, however, the two models are the same.

Due to the direct mapping between the Facebook and Twitter models, we can determine whether the tie strength model generalizes to a new community, one where fundamentally different social dynamics may have arisen. For example, Twitter limits posts to 140 characters. Facebook has no limit and lets users post photos and videos. The two sites embrace the idea of underlying networks, but Facebook only has undirected links. Twitter allows directed links: you can see what I post without me necessarily reciprocating. It seems reasonable to think these and other implementation differences could give rise to very different social dynamics.

TABLE 3

| Facebook predictors | Twitter predictors | β |
| --- | --- | --- |
| Days since last comm. | Days since last comm. | −0.587 |
| Days since first comm. | Days since first comm. | 0.581 |
| Intimacy × Structural | Intimacy × Structural | 0.308 |
| Wall words exchanged | @-replywordsexchanged | 0.228 |
| Mean ts of mutual friends | Mean ts of mutual friends | 0.198 |
| Educational difference | Follower difference | −0.123 |
| Structural × Structural | Structural × Structural | 0.150 |
| Reciprocal × Reciprocal | Links × Links | −0.146 |
| Initiated wall posts | Initiated @-replies | 0.112 |
| Inbox thread depth | Direct message headers | −0.105 |
| Number of friends | Following count | −0.1000 |
| Soc. Distance × Structural | Soc. Distance × Structural | 0.100 |
| Number of applications | no analog | |
| Wall intimacy words | -reply intimacy words | 0.085 |

The Twitter model had one obstacle to overcome: the Facebook Educational difference predictor has no convenient Twitter analog. On the whole, Twitter is a much leaner medium than Facebook: Twitter has no direct substitutes for the social distance variables found in Facebook. For instance, twitters do not report political affiliation in Twitter, but over 80% of people do in Facebook. Without Educational distance, the Twitter tie strength model has no social distance predictor. To bring social distance into the model, we substitute the difference in follower counts, a "frame differential," termed Follower difference. Rather than copy its coefficient directly from Educational difference, Follower difference derives its coefficient from the average of the four social distance predictors in Facebook model, thereby changing slightly. As in the Facebook model, we take the log of every predictor.

The Twitter model builds tie strength recursively in the same way as the Facebook model. It defines tie strength as a function of other tie strengths with mutual friends. The Twitter prediction model uses the 13 predictors listed in Table 5, mixing them together in these ratios. The Twitter prediction model has an index, called Intimacy, which blends four raw variables: three word measures and whether the relationship is reciprocal. Structural is Median strength of mutual friends, as in the Facebook prediction model. Social Distance refers to the follower different predictor. Days since first communication also uses the order in which a user followed someone, something the Facebook prediction model could not get from Facebook. Days since first communication equals the minimum of these two standardized values. For example, if I followed you $3^{rd}$ in my list of 200 people, but only just communicated with you, it chooses the standardized version of "$3r^d$." In this example, Days since first communication becomes $1.67=[(200-3)-\mu]\sigma$, where $\mu$ and $\sigma$ are the mean and standard deviation of the set $\{1, 2, \ldots, 200\}$, 100.5, and 57.88 respectively. In total, the model uses 19 raw variables mapped onto 13 predictors to compute tie strength. We chose this many because we reached a practical limit on how many we could retrieve from Twitter in acceptable web-response time.

If We Meddle mispredicts a strong tie as a weak tie, or vice versa, users can correct its judgment. Hovering over a profile picture, a user can click a "That's not right!" link (not shown), effectively relabeling a strong tie as a weak tie, or vice versa. With this corpus, a corpus we hope to grow by providing a service users find valuable, we can both validate and extend the tie strength model. In other words, during the natural process of using We Meddle, users will leave a trail from which we can conduct our research. Beyond this, we hope the site demonstrates the worth in design and use of tie strength within social streaming models.

Designing with Tie Strength

Just as We Meddle revolves around tie strength architecturally, tie strength also organizes the design. In stark contrast with (every) other social media, We Meddle is not socially agnostic: everyone is not the same. Twitter and Facebook, for instance, give equal prominence to everyone. We Meddle does not; it allows users to style the stream by tie strength. With further reference to FIG. 5, a main slider 110 of the graphical user web interface 104, which provides reference to an inner circle 112 versus an outer circle 114, gives users the ability to emphasize strong ties at the expense of weaker ones, or the other way around. While the main slider 110 is disclosed, any knob or such user-settable indicia may be employed. As a user slides toward the inner circle 112 or the outer circle 114, We Meddle adjusts profile picture size, typeface, font size, and opacity. Pushing the slider 110 all the way to the inner circle 112 removes weak ties from the interface, and pushing the slider 110 all the way to the outer circle 114 removes strong ties. Placing the slider 110 in the middle essentially replicates twitter.com. The slider 110 remains in place across page loads and logins to support stable mental and visual models of the interface. We like to think of it as a socially zooming interface.

We would like to restate from a design perspective that We Meddle calculates tie strength automatically in the background, without user action. Some current interfaces allow users to group their friends or the accounts they follow (e.g., TweetDeck's groups, Facebook's Friend Lists), but users need to expend lots of effort to build them. Furthermore, many people do not neatly fall into groups, which at the very least ebb and flow with time. We wanted users to do as little work as possible. We Meddle might not get it completely right, but early results indicate that it gets users most of the way.

From social support to finding new information, the literature strongly and repeatedly suggests that we get different things from different kinds of ties. To support this in Twitter's mediated environment, the web interface 110 provides a set of filters 118: Links, Positive Tweets, Negative Tweets, Frequent Posters, and Infrequent Posters. As with social zooming, the filters persist until the user unsets them. When a user applies a filter 118, a smooth animation takes them to a new state of the content stream. Used in conjunction with social zooming, users can powerfully filter tweets, e.g., "only show me tweets by weak ties who post infrequently" or "emphasize tweets by strong ties with negative sentiment."

Figure 6:
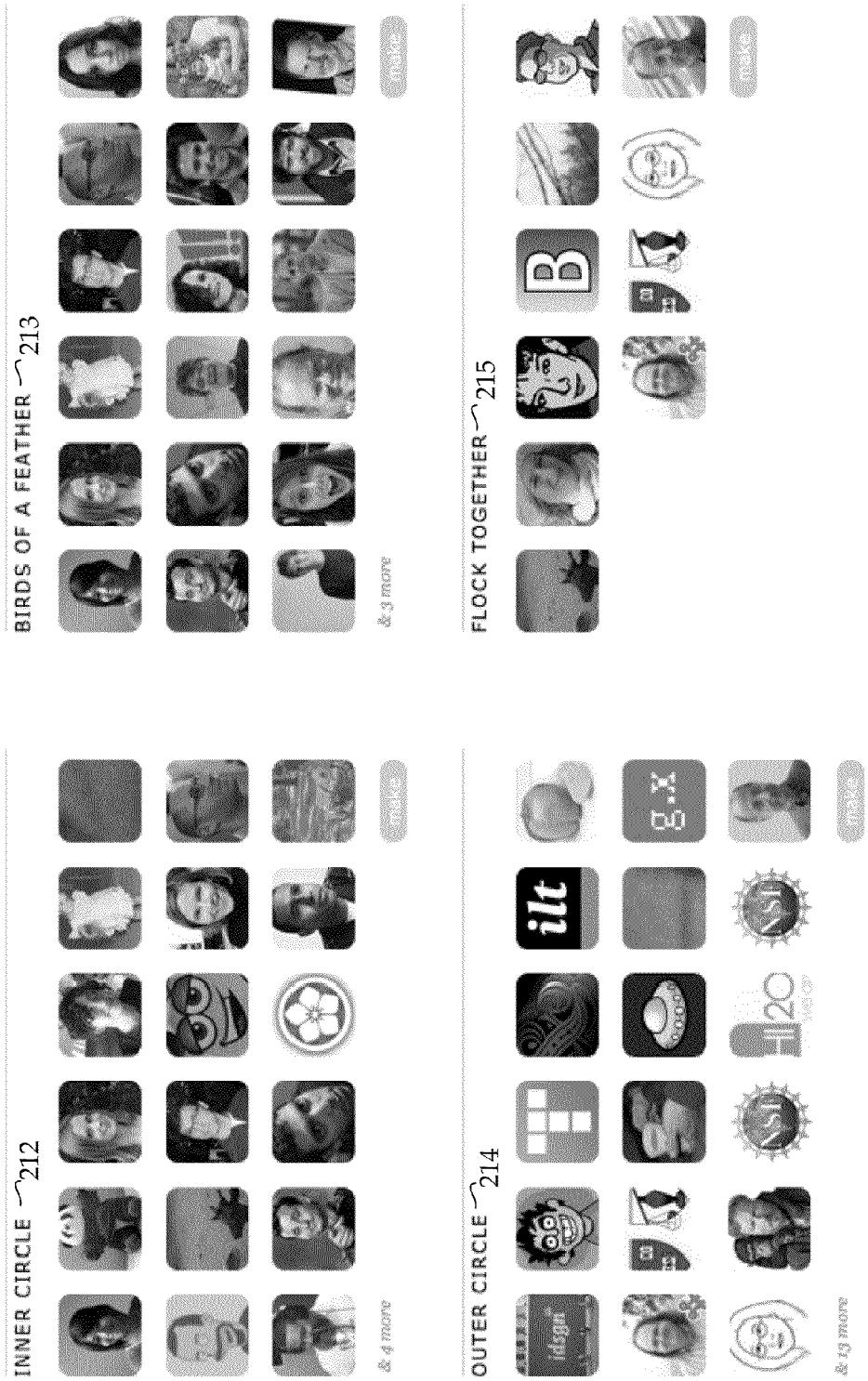
FIG. 6 is a screen shot of another page of the We Meddle web interface, showing groupings of Twitter contacts for a user determined by the disclosed tie strength prediction model.

FIG. 6 is another page of the We Meddle web interface 104, showing a grouping of Twitter contacts for a user determined by the disclosed tie strength prediction model. On first log in, the system on which We Meddle runs, which will be discussed in more detail later, computes tie strengths for everyone the user follows. The "Inner Circle" 212 and the "Outer Circle" 214 are groups or lists that correspond to strong ties and weak ties, respectively. Other lists are envisioned and could be developed where inner and outer circles are merely examples. We Meddle also computes groups or lists corresponding to social communities in the underlying social network, labeled as "Birds of a Feather" 213 and "Flock Together" 215 in FIG. 7. Users can store these lists inside Twitter and use them in any client and computing or communication device they like.

A user can drop someone from a list by clicking on that person's profile picture. When she clicks, the profile picture goes to 25% opacity, holding its place to remind the user that she dropped the account. When she is happy with the list, she can create it, storing the list in Twitter. Storing the list in Twitter means that she can access it from any Twitter client, using the list in ways the particular client affords. For instance, the popular Seesmic web client lets you view each list in its own column, meaning that you can slice the conventional Twitter stream into multiple views. A We Meddle user can go to Seesmic and see their Inner Circle flowing into a separate column beside the main stream, using the split view to make sure she does not miss any strong tie tweets. A short demo video on the site shows users how this could look.

We Meddle takes its inspiration from real life social relationships and is an attack on the collapsed context problem. In real life, we do not pay everyone equal attention. Expanding on the wedding analogy from earlier, imagine yourself standing in the receiving line while everyone in your life comes to talk to you, one by one, in random order. They can talk as long and as often as they want, effectively blocking the people you truly care about. Anyone who already finished can cut back into line anywhere they like. We permit something very similar from our stream clients. We Meddle tries to make this better by making informed guesses about a user's relationships with everyone they follow, and then lets users carve up their stream by those guesses.

Users cannot add people to the lists We Meddle generates. This is by design. Adding accounts to the We Meddle lists could change their meaning. How can we be sure that Inner Circle still means strong ties? Perhaps the user started from We Meddle's suggestions but branched off to create a list with a different meaning. Limiting users to deletions is an experimental decision. It allows us to argue that the Inner Circle and Outer Circle retain their meanings. When a user removes a connected person from a list, the model may adjust (or correct for errors) by updating feature weights of the model to reflect the user's preferences in making the removal decision. When a user removes an account from the Inner or Outer Circle, we also learn where the model makes mistakes. These clicks are crucial experimental data: during the natural process of using We Meddle, users leave a trail from which we can study tie strength. Of course, users can add people to their Inner and Outer Circle lists outside We Meddle. They can go anywhere that has a list interface and put whoever they want in them. However, it turns out that users did not do this often, something we discovered in follow-up interviews presented later.

Communities

When people discuss their social networks, they usually do so in two ways: tie strength and communities. While the present disclosure is about tie strength, We Meddle tries to support this natural practice. We Meddle uses a community detection algorithm to decompose a network of a user's friends or followers into as many as four social communities. These communities often correspond to groups we can easily name when we see them, like "College Friends," "Former Colleagues," and "CHI Researchers." Users can store these lists in Twitter, too. We Meddle uses a freely available community detection algorithm, called the Markov Cluster Algorithm, to generate them. The algorithm does random walks of a network, noting that nodes within a community have more paths between one another than nodes in different communities. It is by no means the most efficient algorithm for optimizing modularity, seemingly $O(|V|^3)$, however the package offers an open source implementation in C: tweakable code that runs fast on the networks that We Meddle typically encounters.

Architecture

The core We Meddle tie strength engine is written in Perl, appropriating the output of an R statistical model, although the engine is not limited by the software language used to implement it. When a user first signs in to We Meddle, the system needs to build a database of tie strengths for each account the user follows. The sign-in forks off hundreds and sometimes thousands of API requests against Twitter. This was the main technical hurdle: overlapping the relational data requests in precisely the right way to support hundreds of simultaneous users.

As the API requests come back, they first filter through the non-structural parts of the tie strength model. When they all come back, the Perl-based model percolates the non-structural tie strengths through the user's network. This may be formulated as an eigenvector centrality problem, but in practice a simple percolation loop with five iterations seems to always converge and consumes far fewer resources. Near the end of the tie strength computation, the tie strength engine projects all tie strengths onto a [0, 1] interval. People that are one-half standard deviation above the mean get marked as a strong tie; people that are two-thirds of one standard deviation below the mean get marked as a weak tie. We found these cutoffs through trial and error during pilot tests in our lab. After computing all tie strengths, they get written to a MySQL database where We Meddle can read and act on them. The web interfaces seen by We Meddle users are written in PHP and Javascript, making heavy use of the jQuery toolkit for animations and asynchronous communication. The server side of We Meddle interacts with Twitter via an open source Twitter library called twitter-async that we modified to serve We Meddle's needs.

On the Web

Figure 7:
FIG. 7 illustrates We Meddle's user distribution by country.

In January 2010, we made We Meddle open to any Twitter user on the web, and since then has been available at wemeddle.com. After announcing it on a few mailing lists and on Twitter, the site spread by word of mouth. We could have instead performed a lab study: recruit Twitter users from around campus to tell us whether We Meddle's guesses match how they feel about their networks. But, two points make a study on the web better. First, releasing We Meddle on the web can establish if this approach helps solve anyone's problems. Second, by lifting the college campus sampling frame from the Facebook model, we can have more confidence in the results that come from this study as We Meddle has seen users from all over the world—something we never could have replicated in the lab. FIG. 7 illustrates We Meddle's user distribution by country. At the time of this writing, 1,532 people from 52 countries have used We Meddle. Most uses come from the United States, but China also has a strong presence, accounting for about 10% of We Meddle's users. Nearly 15,000 people have visited the site. However, it requires a login plus read/write access to your Twitter account, and we suspect many have turned away as a result of this requirement.

Generalization

When a user drops someone from the Inner Circle or Outer Circle, we can say that the model made a mistake. Whether the disclosed Facebook tie strength prediction model generalizes hinges on the how many mistakes We Meddle makes.

We argue that the tie strength model generalizes when we see a comparable error rate to the one seen in the Facebook model. In other words, it generalizes to Twitter if it gets about 87-88% of its predictions right. We Meddle received 1,105 corrections from 236 different users. Most We Meddle users made no corrections. We could view this as a huge success: the majority of users experienced complete and utter success with We Meddle. Of course, this is the blindly optimistic interpretation. Some of these users probably thought We Meddle got everything right. However, other people probably did not realize they could correct We Meddle—which qualitative data tends to support—or felt it was not worth the effort to make the clicks. Because We Meddle straddles the boundary between an experiment and a system people want to use, we have to correct for issues like these.

Here, we make an argument for a conservative upper bound on We Meddle's error rate. First, we consider only data from the 236 We Meddle users who made at least one correction and at least one list, putting aside users who did not. This method leaves out anyone who felt We Meddle's predictions closely matched reality and did not make corrections. Several hundred people made lists without a single correction. But, we know these 236 users understood the process by which they could correct We Meddle and subsequently made a list. We Meddle observed 27,529 relationships from these 236 users. Of these, users only had a chance to correct accounts that We Meddle marked as a strong tie or a weak tie, a total of 14,075. So, users corrected 1,105 out of 14,075 relationships, or 7.85%. However, as explained in the previous section, users had no way to tell We Meddle that it had forgotten someone; they could only drop people from lists. Since We Meddle is approximately as likely to underestimate tie strength as it is to overestimate it, one can simply double this percentage, obtaining an upper bound of 15.7%. While slightly higher, it closely resembles the error rate of 12-13% for the Facebook model, especially when you consider that 15.7% is a conservative upper bound. Primarily from this number, but with support from the qualitative data presented next, we claim that the tie strength model presented here generalizes to a new social medium.

Mistakes in Terms of Predictors

Figures 8, 9:
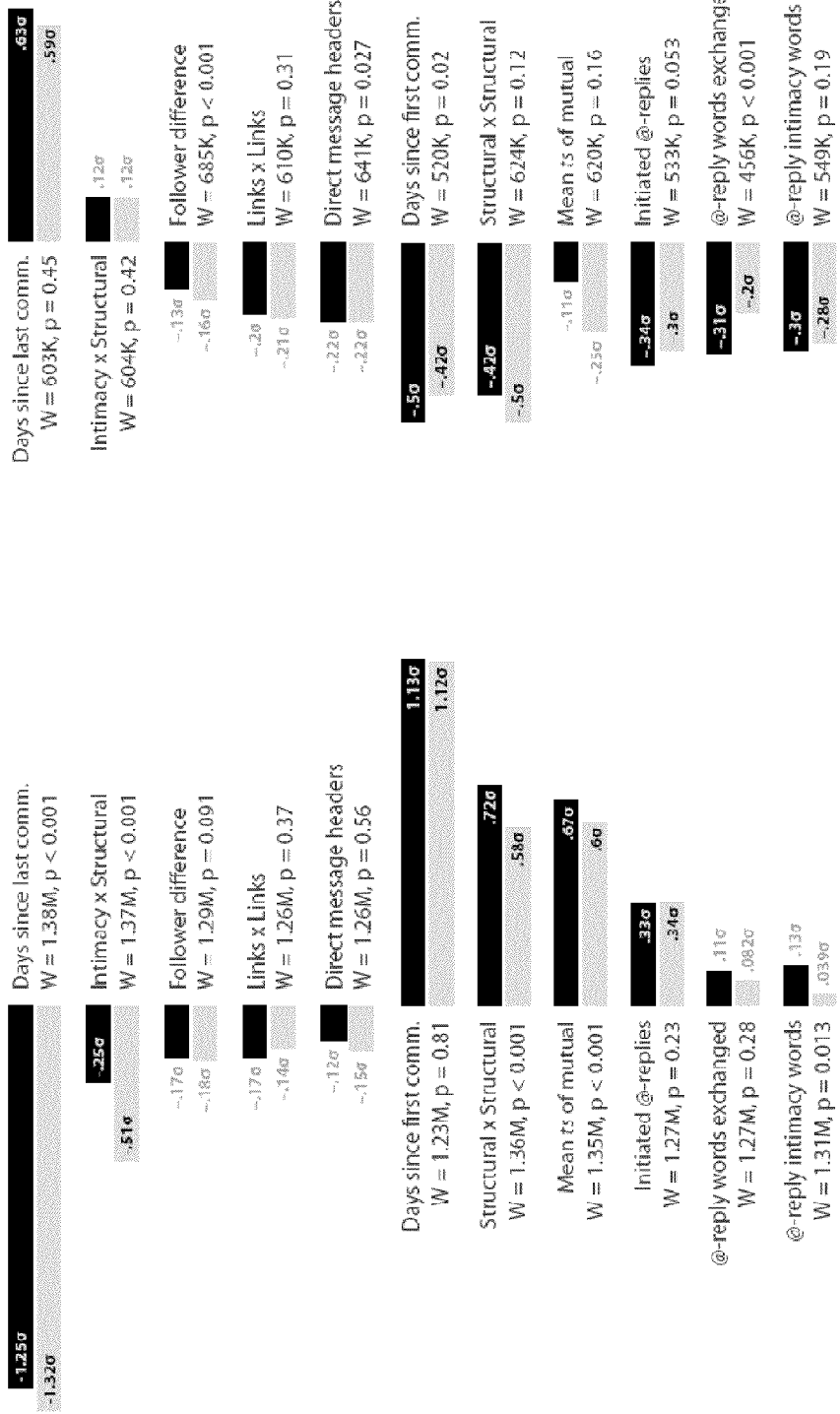
FIGS. 8 and 9 summarize mistakes made by the Twitter tie strength prediction model, respectively expressed in terms of input predictors for strong ties and weak ties, thus indicating how the Twitter tie strength prediction model differs in subtle ways from that of the Facebook model.

Next, we analyze how We Meddle's mistakes express themselves in terms of the model's input predictors. This can tell us how the Twitter tie strength model differs in subtle ways from the Facebook model, and how we might improve it. FIGS. 8 and 9 summarize the results, respectively for strong ties and weak ties. Each pair of bars compares two groups, correct predictions (in black) and mistakes (in gray), which are limited to only those users who made a correction. At the end of each bar is the within-user, standardized median for the predictor. The W refers to the Wilcoxon statistic.

FIG. 8 shows that true strong ties have a lower Days since last communication predictor than mistakes, Wilcoxon W=1.38M, and p<0.001. Note that use of Wilcoxon tests reflects the non-normality in the data. We use the within-user, standardized median for each predictor. That is, we compare numbers standardized against all relationships corresponding to a user. As the same model generated both the correct predictions and the mistakes, differences stem from differences between correct predictions and mistakes, not artifacts of the model.

What jumps out most is the contrast between strong (FIG. 8) and weak (FIG. 9) tie mistakes, particularly the role of the network in strong tie mistakes. Three network predictors have large effects with respect to the strong ties: Intimacy×Structural (0.263 standard deviations), Structural×Structural (0.134 standard deviations) and Mean strength of mutual friends (0.073 standard deviations). Interestingly, something outside the model itself suggests why. The strong tie mistakes disproportionately belong to big clusters, evidenced by their membership in the lists generated by community detection on the underlying social network, $\chi^2$=37.43, p<0.001. Recall that the model blends tie strength recursively through the network: it is a function of the tie strengths of mutual friends. Due to the summary statistics over the cluster, this means that many relationships benefit from a single strong tie in a big cluster. These network predictors make a strong case for a more refined view of the network in the tie strength model, something we discuss in more detail later.

In contrast, the network-based predictors in FIG. 9 vanish. Instead, we see strong effects (e.g., weak tie mistakes) by Follower difference and @-reply words exchanged, with correct predictions lower than mistakes, perhaps signaling the ease with which you can message a higher-status user or someone you do not know on Twitter. Whereas, on Facebook, someone must confirm my friend request before we can exchange messages, on Twitter I can send messages to President Obama if I like.

How Users Experienced We Meddle

To understand how users felt toward We Meddle and whether the site solved anyone's problems, we conducted interviews with our users. We picked users at random from the logs and @—mentioned them on Twitter. After they replied, we conducted eight semi-structured interviews in whatever medium they preferred (e.g., phone, IM, OR email). The participants ranged widely in backgrounds and in how they used Twitter, from young coders to small business owners who primarily used Twitter for promotional reasons. We Meddle received many hundreds of comments via the web, and we present a selection of them at the end of this section. The point of the interviews was to elicit feedback from people who did not say anything on the web, hopefully removing the inherent self-selection bias that comes from speaking up publicly. The interviews took about 30 minutes. Email interviews consisted of questions similar to IM and phone interviews, but we often had follow-up conversations to clarify points. Typically, participants logged into We Meddle to look at the lists while we talked.

When asked about the composition of the tie strength lists, participants reflected on the accuracy of their lists and the tie strength concept in their lives.

Question: Did the lists reflect your real social life?

Answer: Um, I was pretty amazed to tell you the truth, Really amazed cause, um, the one I had an extreme [sic] hard time with trying to figure out was the Outer list. And this was probably the same with most people cause they're not people you communicate with much. So, I only remember one person I actually recognized on the Outer list. But the other three [Inner Circle, two communities] were pretty close to right on. It's actually kind of fun to look at the Inner Circle and say, "Wow, look at that person, I haven't talked with him in a long time, but they totally fit there." Yeah, there's some of those in here. It's kind of astounding and scary how good it is.

Question: The people it chose for your Inner Circle, did they fit?

Answer: I would say the Inner Circle is about 70% accurate, maybe 80%. And it does actually a fairly—well, it's such an interesting question, right? So, it includes my wife, which is good. And people like [name] who runs [my online community], which is good. And my baby blogs, but doesn't tweet. But mostly what it is, is the Inner Circle is a sort of a blend of my immediate personal universe and probably my two most important social universes.

The last statement captures the way scholars often talk about tie strength: it skims off people from different social circles. In some cases, users expressed surprise when We Meddle correctly identified certain people in their lives.

Question: The people it chose for your Inner Circle, did they fit?

Answer: A few of the . . . well I remember a few of the people in the Inner Circle are actually relatives, and that was pretty cool. I didn't expect that.

Answer: It's interesting that it actually placed my girlfriend four rows down versus at the very top, where I would expect her to be.

Question: But she's in the list?

Answer: She's in the list, yeah absolutely, most of the lists actually, I hope she doesn't see the four rows down part. [participant laughs]

However, we did hear about problems. For instance, two users discussed relational contexts which fell outside We Meddle's built-in assumptions.

Question: The people it chose for your Inner Circle, did they fit?

Answer: Some people on Twitter just say stupid things. Or, they might say something that's inaccurate. So there's a few people I see who are not in my Inner Circle, you know, my group . . . people I actually hang out with. But we have had disagreements on Twitter. We argued.

Question: The people it chose for your Inner Circle, did they fit?

Answer: The Inner Circle is actually not super accurate. Yeah, the Inner Circle is basically all the people I used to work with . . . But I talk with them, sort of irregularly, now that I'm not at [company] anymore. [How close were you when you worked there?] Yeah, I was close to them while I was there, so it's fun to see them here from an old job. Maybe there should be a category for them: like people you used to be close to, but you know, aren't anymore.

Relationships can be intensely negative. In fact, we received a handful of mildly annoyed emails from We Meddle users wondering why their ex-partner appeared in the Inner Circle. The tie strength model does not understand these relationships. The former colleague story shows how a biographical break can influence someone's viewpoint. This participant felt close to his co-workers one month, and then did not the next. The Facebook tie strength prediction model saw similar problems, and future work could do better by trying to resolve them. However, a perhaps strange way to see these problems is as a sign of generalization: the Twitter model makes the same kind of mistakes as were made in the Facebook model.

Reaction Via Twitter and the Web

Figure 10:
FIG. 10 is a tweet, one or the many unprompted comments via Twitter about the effectiveness of We Meddle and the underlying Twitter tie strength prediction model.

We Meddle received hundreds of unprompted comments via Twitter and the web. FIG. 10 shows one or the many unprompted comments via Twitter. The user writes, translated from Chinese, "This thing is miraculous. I really want to know how it works. It even classifies by GF's account into Inner Circle, but I never send tweets to her account, and it also classifies accounts I don't care about into the outer circle." In addition to FIG. 10, we include a selection of these tweets below:

Tweet: wemeddle.com is a very cool idea for making twitter lists. It was good enough to re-create lists I made myself! Worth checking out.

Tweet: Fascinating clustering of those you follow by strong and weak ties.

Tweet: Oh geez, this application is a great filter for your Twitter contacts. [translated from Romanian]

Tweet: This is a great way to auto-create useful #TwitterLists.

Tweet: trying we meddle. [ . . . six minutes later . . . ] didn't like we meddle.

Tweet: #intelligence & automatic learning inside RT @[account] . . .

Tweet: Liking what the folks at We Meddle are doing with the @TwitterAPI!

Tweet: We Meddle: site to build Twitter lists based on past conversations.

Tweet: Easiest Twitter list maker from @wemeddle.

Tweet: Okay, We Meddle is very nice. Thanks @[referrer].

Tweet: @[previous tweet] Just did and guess what, you are in my inner circle.

Tweet: If you are too lazy to take the time to make lists, we now have a new choice. We Meddle automatically analyzes your friends to generate several lists, which you can then make. [translated from Japanese]

Tweet: We Meddle is really good. It automatically divides my friends into groups, so that occasional tweets from my important friends won't be buried in an ocean of other tweets. [translated from Chinese]

These tweets mainly speak to the value users found in We Meddle. Each tweet originally included a link to direct people to the site, which we edited in the interest of brevity. We see this willingness on the part of our users to spread the site as strong evidence for its value to them. We Meddle did not have any prompt anywhere asking users to share the site with others. In addition to the reaction via Twitter, a handful of bloggers reviewed We Meddle. We include snippets of two reviews here:

Blogger: People who follow lots of other people on Twitter and who work with lists know: those lists come in handy when you want to filter information and only listen to people you would describe as kindred spirits. Or friends. Or interesting sources. [includes screenshot] Today, [other site] pointed me at We Meddle. If you login with your Twitter account, after a few minutes, the site suggests new Twitter lists based on the interaction you've had with people. It works quite well. If you like it, you can save it as a (private) list, and you can make adjustments if you want. [translated from Dutch]

Blogger: Thanks to [referrer] yet again for pointing me at We Meddle, which scans your Twitter activity and creates groups of tweeps like "Inner Circle" and others. [includes screenshot] This collection is not entirely accurate and I apologise to those tweeps who are obviously missing. You can click on a tweep to remove them from a list before saving. Nevertheless, this makes a great visual of your Twitter universe . . . Clicking on the Make button creates a Twitter list for you automatically. It would be good to be able to drag tweeps from one list to another. Still this is another great example of a Web 2.0 app of extreme simplicity that does one job well.

Discussion

Our results show that the Facebook predictive tie strength model generalizes to a new social medium. The error structure, based on the intersection of quantitative and qualitative data, matches what we see in the Facebook model. We believe the interviews and grassroots web commentary illustrate the value users find in the approach. We therefore contextualize our findings within social media theory and design.

If the model aligned precisely with social dynamics in Twitter, FIGS. 8 and 9 would show no effects for any predictors. However, the error analysis reveals wrinkles in the tie strength model. Remember, though, that these mistakes represent at most 15.7% of the data; their effect on an updated model would be subtle. Some predictors from FIGS. 8 and 9 probably reflect Twitter itself. For instance, the part played by Days since last communication in strong tie mistakes suggests that Twitter is more recency-driven than Facebook: tie strength seems to decay faster there. @—reply words exchanged in strong tie mistakes may suggest that people need to use more evocative language to maintain relationships in Twitter's lean medium. The role of @—reply words exchanged in weak tie mistakes probably reflects non-reciprocal ties in Twitter. Facebook's tie strength prediction model learned a social structure in which a handshake precedes any communication. In Facebook, we have to accept friend requests; Twitter usually has no barrier.

We also find that intensely negative relationships often confound the model. The Facebook model indicts "asymmetric friendships," friendships with big power differentials. Accounting for these relationships remains an attractive target for future research. We tentatively propose to measure these asymmetric friendships with a "politeness" variable. We could measure it textually (e.g., hedges, deference, formal greetings, etc.) or via inter-message response time. For example, we know that in corporate contexts, upper-level management often lets messages sit for long periods of time before responding. Similar temporal dynamics may happen in everyday social media. Politeness may signify asymmetry; lack of politeness coupled with Intensity may signify negative relationships.

Updated Network Component

The network predictors truly stand out in FIG. 8. In Facebook's tie strength prediction model, every mutual friend contributes equally to the network part of the tie strength model. But, why should my wife's sister contribute to my best friend's tie strength, if they only felt obligated to become friends in the first place? Instead, we propose a new, weighted network model, one where each mutual tie has its own tie strength. Practically speaking, this is easier said than done. Not only would we have to estimate every ego-centric tie (as We Meddle does), but also every cross-cutting tie between alters, e.g., immediate friends. In other words, not only would the model have to estimate tie strength for you and all our mutual friends, but also between you and all our mutual friends. To operate in web-response time, this is probably intractable; plus, from the outside we simply cannot see everything every dyad does.

Figure 11:
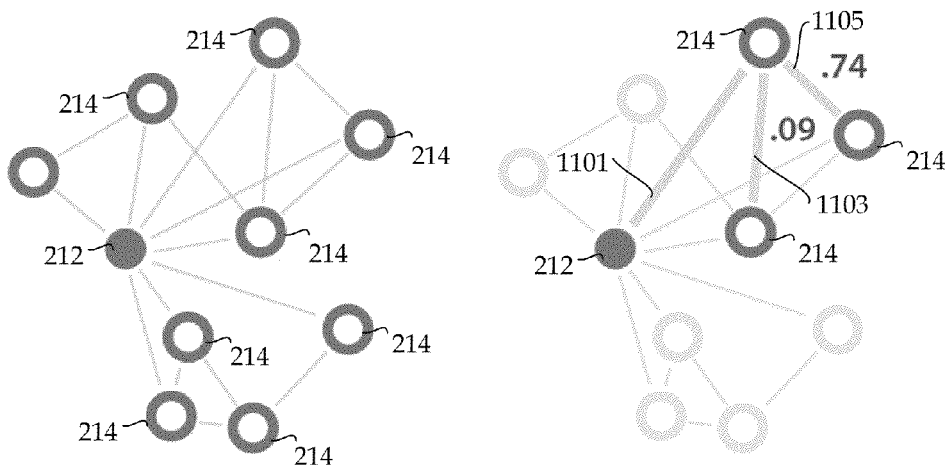
FIG. 11 is an exemplary updated network component for the disclosed tie strength model.

Instead, consider low-fidelity tie strengths on the ties between immediate friends. Draw a few roughly orthogonal tie strength predictors: we could pick Days since last communication and @—reply intimacy words. The model could use tie strengths made only from these two predictors to weight contributions to the tie strength of interest. FIG. 11 illustrates this weighting concept in displaying an exemplary updated network component for the tie strength model. The network component labeled as number 1 (one) is a user's ego network, including links between mutual friends. The dark circles indicate inner circle 212 and the dark rings indicate outer circles 214. In network component labeled as 2 (two), we want to estimate the tie strength of a link 1101. Instead of weighting two mutual tie strengths 1103, 1005 equally, we weight them by low-fidelity tie strengths on the cross-cutting links, respectively 0.09 and 0.74. Conducting this weighting of tie strengths would of course require deeper knowledge of the communication record (e.g., being inside Twitter) or extra crawls at prediction time, causing additional delay. But, as we see in FIGS. 8 and 9, this weighting is the easiest way to bring down the error rate. With the weighting, perhaps 90-95% prediction accuracy is within reach.

Social Media Theory

In this paper, we show that Facebook's tie strength model generalizes to at least one new medium, Twitter. We see this as a big step for the study of social media and computer-mediated communication (CMC): we believe this is the first work to demonstrate that a core property of relationships manifests the same way in two media. Our findings suggest that some important properties of on-line relationships resist sites' implementation details. This is helpful not only because we have so many social media, but because they change so often. Facebook has changed, perhaps substantially, since our first Facebook study in 2008. Among many changes, Facebook has added comments directly on statuses, photos, and videos. In 2008, everything happened threadlessly on the Wall. Maybe practices have changed in response. The Facebook tie strength prediction model worked for We Meddle, which was built a year and a half after the Facebook model.

We have a vast literature on how tie strength modulates all kinds of social phenomena, from financial trading to the spread of values to the cohesion of groups. Consequently, we see opportunity to study other things by predicting tie strength. For example, what mix of ties keeps users on sites the longest? Mostly strong? A core of strong, but otherwise mostly weak? Do certain mixes of ties promote pro-social behavior online? Answers would have profound consequences for how we see online communities and how owners operate them. Or, instead of asking questions about social media, we might ask questions that simply use social media as a setting, like "Does tie strength modulate happiness in online networks?" New evidence shows how tie strength affects the diffusion of links across the Twitter network. More ambitious agendas, like the spread of emotions or deeply held beliefs, may be within reach.

Social Media Design

In this paper, we also demonstrate that computing tie strength helps users deal with the consumption side of the collapsed context problem: thousands of people compressed into a single stream. Whereas the Facebook model conjectures that predicting tie strength can make social media experiences better, the Twitter model paper shows it. We Meddle demonstrates that tie strength can help solve real problems of real people with social media. However, if we controlled all of Twitter's bits and levers, we would not have picked the consumption side of the collapsed context problem. We would have picked the production side: imagine sending messages only to strong tie colleagues (e.g., the intersection of the Inner Circle and a community list) without having to work at generating those lists yourself. We hope that our We Meddle case study encourages designers to experiment with tie strength. Whereas the Facebook model briefly sketches many ways tie strength could inform design, here we conclude by drawing a longer scenario showcasing tie strength.

Figure 12:
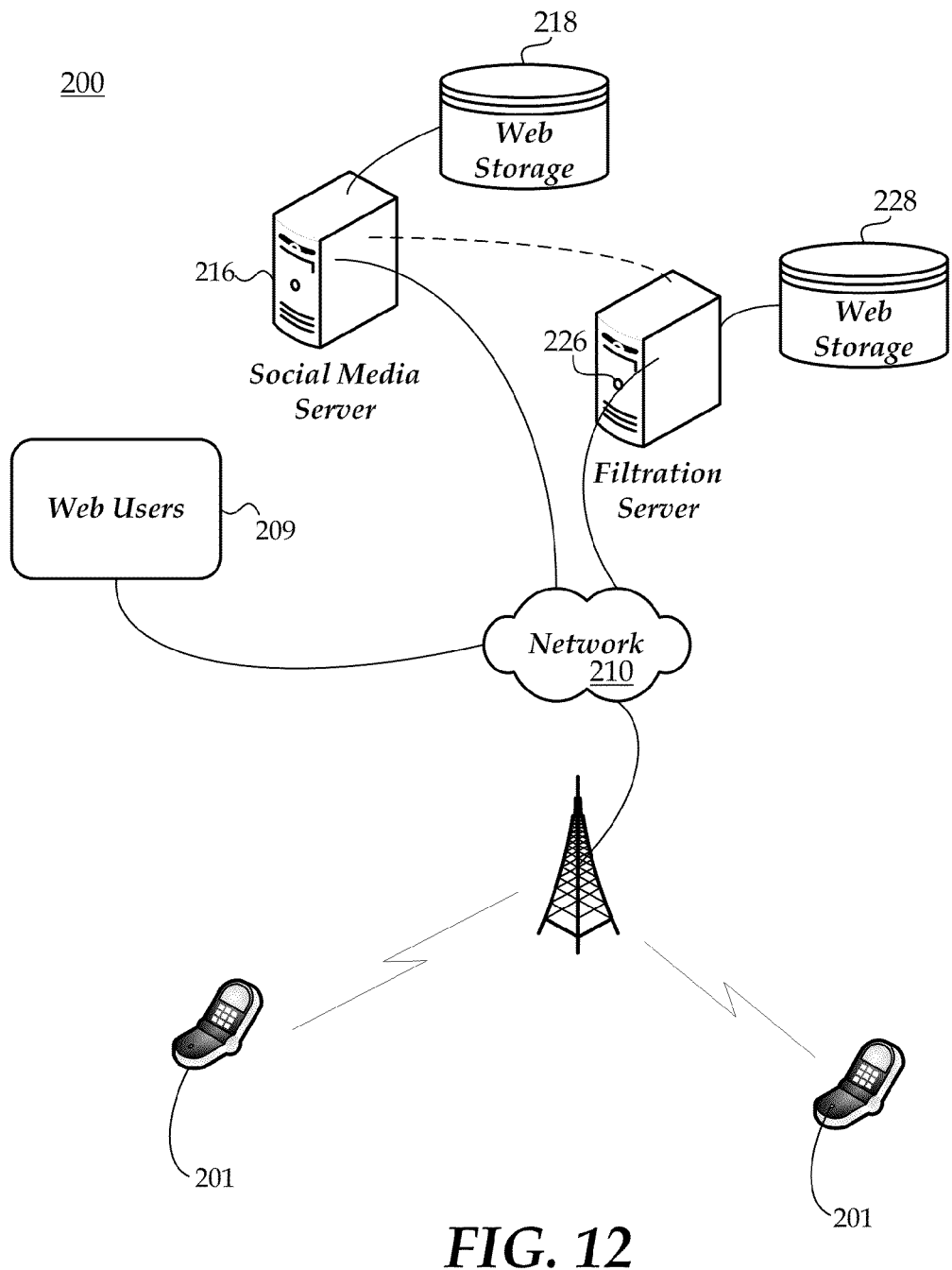
FIG. 12 is a system diagram of an exemplary computer system to execute the web interface and Twitter—or other social media—content stream as described with reference to FIG. 5.

FIG. 12 is a system diagram of an exemplary computer system 200 to execute the web interface and Twitter—or other social media content—stream as described with reference to FIG. 5. The system 200 is exemplary and may be adapted to provide filtration for other social media content streams as discussed herein, including for Facebook. The system 200 includes a plurality of Twitter users (followers and tweeters) on either mobile devices 201 or who are other types of web users 209, e.g., that use desktop computers or other types of computing devices, such as a laptop. The users may also include Facebook users in the context of a Facebook tie strength prediction model. The social media users communicate and post over a network 210 that includes the Internet, one or more intranets, local area or wide area networks (LAN/WAN), or other network.

The system 200 also includes a social media server 216 having web storage 218 used by Twitter to organize and ensure that followers of different tweeters receive content streams of those tweeters and that statuses of Twitter users gets updated. The web storage 218, therefore, may include tweets, statuses, and content passed to and from Twitter users. The system 200 may also be applied to the Facebook prediction model, and thus the storage 218 may include posts or status updates and the like of Facebook users or any other update or streaming content of other social media. The social media server 216 doubles as a web server as the server 216 is configured to deliver tweets and statuses and other Twitter content—or posts and photos and the like if for Facebook—to a variety of browsers across a variety of stationary and mobile communication devices. The system 200 also includes a filtration server 226 having web storage 228 that is coupled with the social media server 216.

The filtration server 226 and social media server 216 are coupled with each other, either directly or through the network. Indeed, the filtration server 226 and web server 216 may be integrated as one server so that the socially zooming interface 104 in FIGS. 5 and 6 are created in that server and directly served to browsers of social media users. Herein, the phrase "coupled with" is defined to mean directly connected to or indirectly connected through one or more intermediate components. Such intermediate components may include both hardware and software based components, including the network 210.

The social media server 216 serves web pages to the social media users, including the web interface 104 displayed in FIGS. 5 and 6, whether they connect via their desktop, computing, or mobile devices. The filtration server 218 provides an intermediate step to that service in which the execution of the server and its software process the content sent by the social media users so that followers receive the type of content dictated by the main slider 110 and the filters 118 discussed above.

Figure 13:
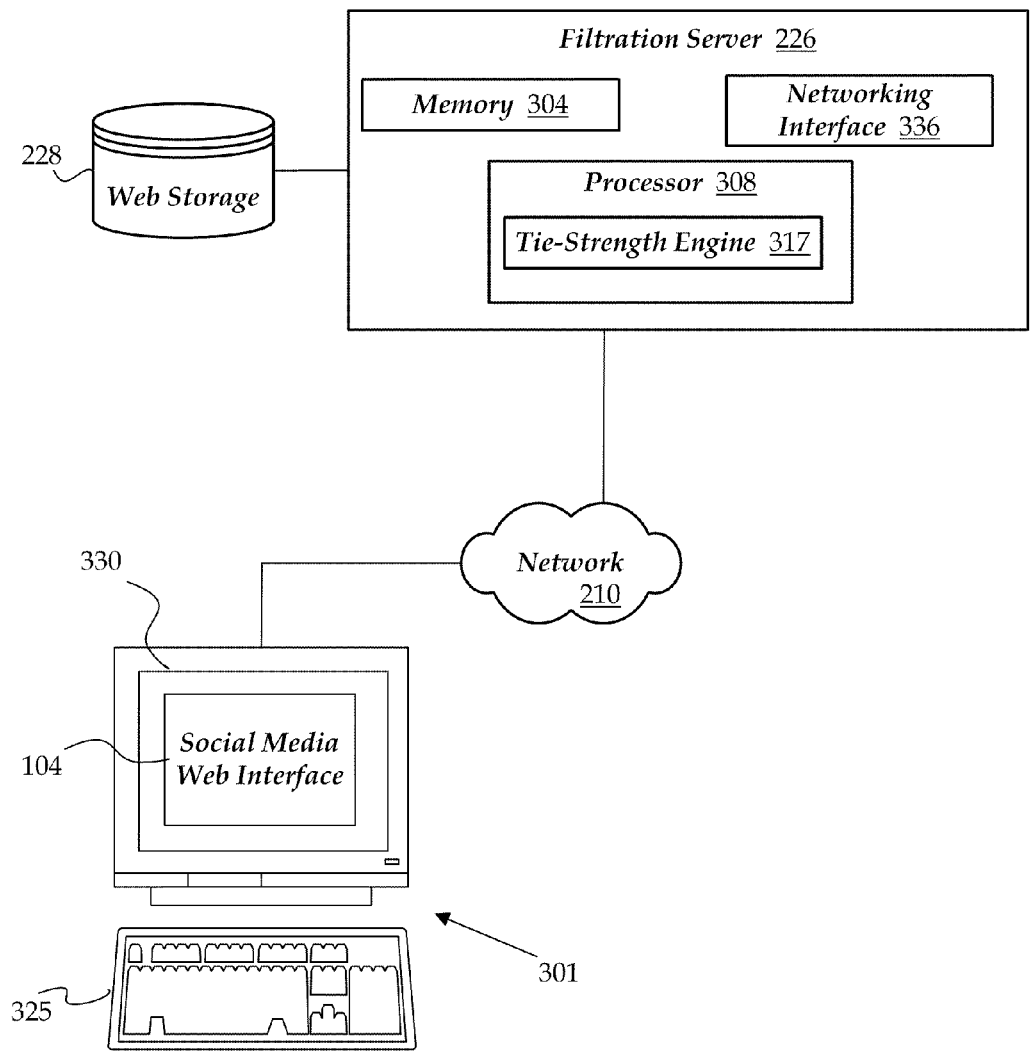
FIG. 13 is a system diagram of the filtration server of the system of FIG. 12 as it communicates with a communication device of a tweeter or follower on Twitter, a friend on Facebook, or any other social media user.
Figure 14:
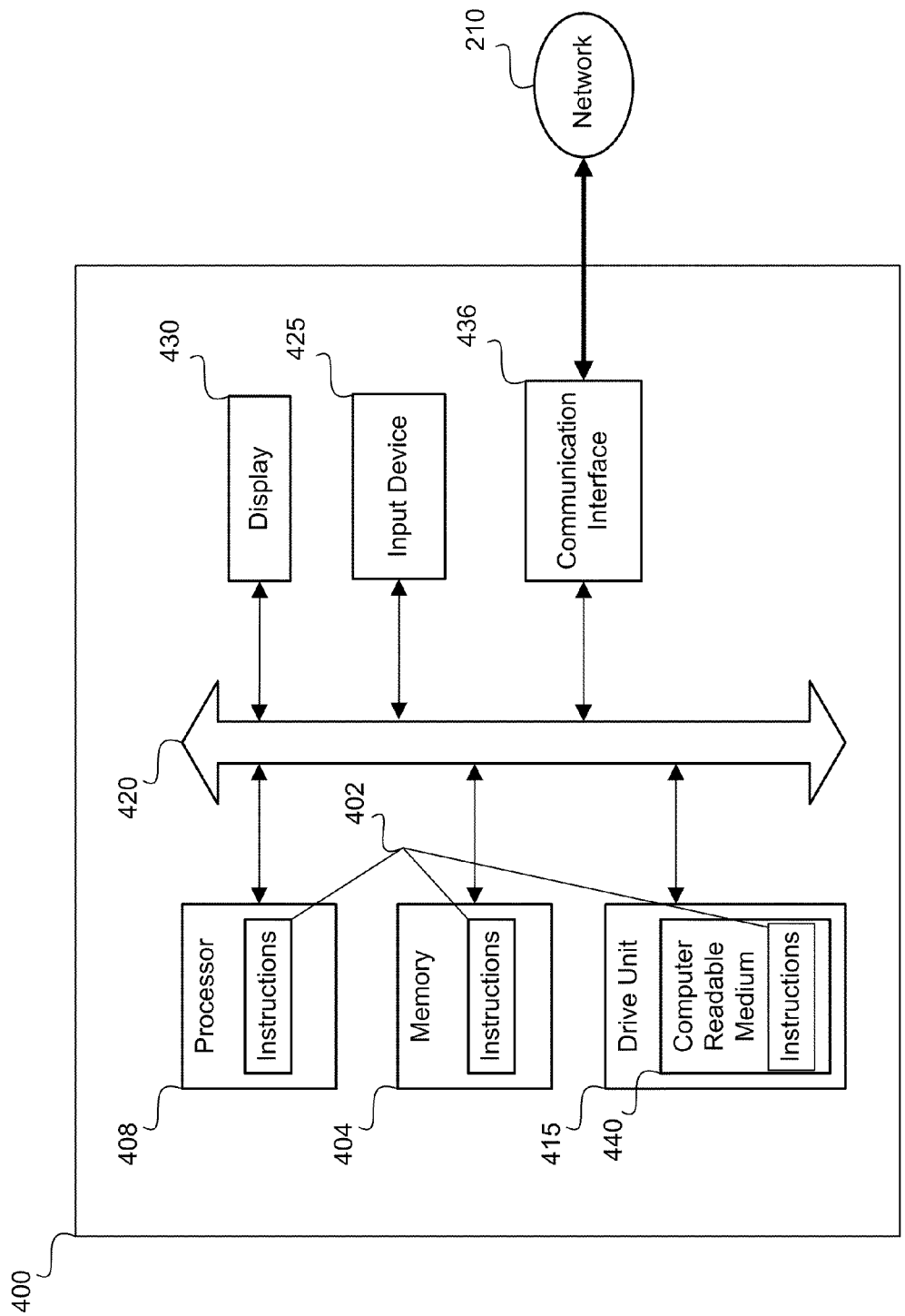
FIG. 14 illustrates a general computer system, which may represent any of the computing devices referenced herein.

FIG. 13 is a system diagram of the filtration server 226 of the system 200 of FIG. 12 as it communicates with a communication device 301 of a web user 209 such as a tweeter or follower on Twitter, a friend on Facebook, or any other social media user. The filtration server 226 includes system memory 304, one or more processor 308, and a networking interface 336. The processor 308 includes a tie strength engine 317 to execute the algorithms discussed above that process the Twitter—or other social media—content according to the slider 110 and filters 118 set by the user. The communication device 301 may include an input device 325 as well as a display 330 to which the social media web interface 104 is to be delivered for viewing by the web user. The communication device 301 may include a personal computer, a laptop, an iPad, any kind of smart phone or other kind of mobile or stationary computing device adapted for web access.

The social media server 216 then, after receiving the filtered content from the filtration server 226, serves the web interface 104 together with the main slider 110 and filters 118 (FIG. 5) to the display 330 of the user requesting the Twitter stream content. The Twitter—or other social media—stream content may then be adjusted by the user with the main slider 110 and/or filters 118 to configure the tie-strength engine 317 to further adjust the level of tie strength required between the user and tweeters sending content before that content is delivered to the web interface 104. The networking interface 336 is coupled with the network 210 and the processor 308 and provides the communication of the content streams as just disclosed. The processor 308 contains different or additional engines or modules, and may execute any number of software modules or code.

Social media users, such as Tweeters, may also adjust groupings of contacts 212, 213, 214, and 215 (or friends if on Facebook) generated by the filtration server 226 as explained with reference to FIG. 6. The social media server 216 then, after receiving the groupings of contacts (or friends) from the filtration server 226, serves the groupings to the web interface 104 on the display 330 of the web user 209. The user may then drop contacts or friends from the groupings 212, 213, 214, or 215 depending on whether the user wants those particular contacts or friends in those groups. Once the groups are formed, the filtration server 226 may again act as an intermediary and filter out content from excluded contacts or friends that are not a part of whatever group the user happens to be following.

Potential, non-limiting applications for the systems and methods disclosed herein include for use as an automated and user-assisted method to create audiences for social media, e.g., asking who should see this batch of photos. This will like be implemented in Facebook in the near future. Also, for use as social zooming used as a paradigm for browsing, searching, and navigating social media. Currently, systems are timeline based.

The systems disclosed herein may also be used to implement a method for improving tie strength prediction for increasingly larger networks or a method for matching people in collaborative groups, finding the right mix of strong and weak ties. The systems can potentially be used for recommendations or to assess trust or to analyze relationships between people over time.

FIG. 10 illustrates a general computer system 400, which may represent the social media server 216, the filtration server 226, a combination of the social media server 216, the filtration server 226, a user mobile or communication device 201 or 301, or any other computing devices referenced herein. The computer system 400 may include an ordered listing of a set of instructions 402 that may be executed to cause the computer system 400 to perform any one or more of the methods or computer-based functions disclosed herein. The computer system 400 may operate as a stand-alone device or may be connected to other computer systems or peripheral devices, e.g., by using the network 210.

In a networked deployment, the computer system 400 may operate in the capacity of a server or as a client-user computer in a server-client user network environment, or as a peer computer system in a peer-to-peer (or distributed) network environment. The computer system 400 may also be implemented as or incorporated into various devices, such as a personal computer or a mobile computing device capable of executing a set of instructions 402 that specify actions to be taken by that machine, including and not limited to, accessing the interne or web through any form of browser. Further, each of the systems described may include any collection of subsystems that individually or jointly execute a set, or multiple sets, of instructions to perform one or more computer functions.

The computer system 400 may include a memory 404 on a bus 420 for communicating information. Code operable to cause the computer system to perform any of the acts or operations described herein may be stored in the memory 404. The memory 404 may be a random-access memory, read-only memory, programmable memory, hard disk drive or any other type of volatile or non-volatile memory or storage device.

The computer system 400 may include a processor 408, such as a central processing unit (CPU) and/or a graphics processing unit (GPU). The processor 408 may include one or more general processors, digital signal processors, application specific integrated circuits, field programmable gate arrays, digital circuits, optical circuits, analog circuits, combinations thereof, or other now known or later-developed devices for analyzing and processing data. The processor 408 may implement the set of instructions 402 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 400 may also include a disk or optical drive unit 415. The disk drive unit 415 may include a computer-readable medium 440 in which one or more sets of instructions 402, e.g., software, can be embedded. Further, the instructions 402 may perform one or more of the operations as described herein. The instructions 402 may reside completely, or at least partially, within the memory 404 and/or within the processor 408 during execution by the computer system 400. Accordingly, the databases 218 and 228 described above in FIGS. 12 and 13 may be stored in the memory 404 and/or the disk unit 415.

The memory 404 and the processor 408 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 400 may include an input device 425, such as a keyboard or mouse, configured for a user to interact with any of the components of system 400. It may further include a display 430, such as a liquid crystal display (LCD), a cathode ray tube (CRT), or any other display suitable for conveying information. The display 430 may act as an interface for the user to see the functioning of the processor 408, or specifically as an interface with the software stored in the memory 404 or the drive unit 415.

The computer system 400 may include a communication interface 436 that enables communications via the communications network 210. The network 210 may include wired networks, wireless networks, or combinations thereof. The communication interface 436 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

As shown above, the system serving social media content and interfaces that convey additional information related to the social media content. For example, the system generates browser code operable by a browser to cause the browser to display a web page of information that includes a social media stream. The social media stream may include a graphical indicator that indicates that the social media stream is associated with an interface that conveys additional information associated with the social media stream, such as user preference data and indicia of grouping with other contacts, tweeters, followers, posters, or the like social media participants. The browser code is operable to cause the browser to detect a selection of the graphical indicator, and display the interface along with the information displayed on the web page in response to the selection of the graphical indicator. The social media stream and the additional information conveyed via the interface are submitted by a user during a social media content submission time.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. A method of predicting tie strength between persons within a social media network, the method implemented by a computer having a processor and system memory, the method comprising:

modeling, with the computer, tie strengths between a user of the social media network and connected persons linked together in the social media network within a model as a combination of: a plurality of predictive variables, interactions between dimensions of the predictive variables, and network structure of the social media network that interlinks the connected persons;

where modeling includes:

fitting equations of the model with tie strengths between the user and the connected persons by determining weights of dimensions of the predictive variables using an iterative variation of ordinary least squares regression; and assigning correlation statistic values to respective predictive variables that indicate an importance of respective predictive variables when in the presence of other of the predictive variables;

altering, with the computer, a stream of social media content received by the user from the connected persons using the tie strength as associated with the respective connected persons according to the modeling; and delivering, by computer, the altered stream of social media content to a communications device of the user.

2. The method of claim 1, where the tie strength between the user and each connected person comprises one selected from the group consisting of strong tie and weak tie along a continuum of tie strength.

3. The method of claim 2, where a browser displayed in the communications device communicates with the computer, the browser including a user-settable indicia to emphasize strong or weak ties along the continuum, the method further comprising:
receiving an input from the user to set the user-settable indicia; and
altering the social media stream to emphasize the strong or weak ties.

4. The method of claim 2, where a browser displayed in the communications device communicates with the computer, where altering comprises:
grouping the connected persons in the browser into first and second lists differing in tie strength to the user; and
allowing the user to remove connected persons from one or more of the first and second lists.

5. The method of claim 2, where the tie strength associated with each of at least some of the connected persons is dependent upon tie strengths between other connected persons.

6. The method of claim 5, where the model used to perform the modeling is integrated within logic of the computer, where the model comprises a linear or a non-linear combination of: the plurality of predictive variables, a plurality of pairwise interactions between the dimensions of the predictive variables, and the network structure of the social media network.

7. The method of claim 1, where the connected persons include tweeters and the stream of social media content comprises tweets from the tweeters.

8. The method of claim 1, where the stream of social media content comprises posts and statuses, and where the connected persons include friends.

9. A system for predicting tie strength between persons within a social media network, comprising:
a server coupled with a social media server, the server having a processor and system memory and in communication with a communications device of a social media user, the processor configured to:
model tie strengths between the user of the social media network and connected persons linked together in the social media network within a model as a linear and superlinear combination of: a plurality of predictive variables, interactions between dimensions of the predictive variables, and network structure of the social media network that links together the connected persons, comprising:
fitting equations of the model with tie strengths between the user and the connected persons by determining weights of dimensions of the predictive variables using an iterative variation of ordinary least squares regression; and
assigning correlation statistic values to respective predictive variables that indicate an importance of respective predictive variables when in the presence of other of the predictive variables;
filter a stream of social media content received by the user from the connected persons received from the social media server using the modeled tie strength as associated each connected person according to a level of strong or weak tie to the user along a continuum of tie strength; and
deliver the filtered stream of social media content to the communications device of the user.

10. The system of claim 9, where a browser displayed in the communications device communicates with the server, the browser including a user-settable indicia to emphasize strong or weak ties along the continuum, the processor to:
receive an input from the user to set the user-settable indicia; and
filter the social media stream to emphasize the strong or weak ties according to the user input.

11. The system of claim 9, where a browser displayed in the communications device communicates with the server, the processor to:
group the connected persons in the browser according to an inner circle and an outer circle, the inner circle generally having strong ties to the user and the outer circle generally having weak ties to the user; and
allow the user to remove connected persons from one or more of the inner circle and the outer circle.

12. The system of claim 9, where the model used to predict the tie strength is integrated within logic of the server, and where the tie strength associated with each of at least some of the connected persons is dependent upon tie strengths between other connected persons.

13. The system of claim 9, where the connected persons include friends and the stream of social media content comprises one or more selected from the group consisting of: statuses, photos, comments, notes, and posts.

14. The system of claim 9, where the processor comprises a tie strength engine that executes the model.

15. The method of claim 1, where the predictive variables comprise at least: intensity of relationship, intimacy of relationship, duration of relationship, social distance and reciprocal services in common.

16. The method of claim 15, where the intimacy of relationship variables are selected from the variables consisting of: number of friends of a user, number of friends of a friend, days since a last communication, wall intimacy words, inbox intimacy words, appearances together in a photo, user appearances in a photo, distances between hometowns and relationship status of a friend.

17. The method of claim 15, where the social distance is selected from the variables consisting of: age difference; occupation difference; educational difference; overlapping words related to religion; and political difference.

18. The method of claim 1, where the predictive variables further include emotional support between the user and the connected persons comprising: wall and inbox positive emotion words; and wall and inbox negative emotion words.

19. The method of claim 1, where the network structure of the social media network includes: number of mutual friends; groups in common; and normalized term frequency-inverse document frequency of free text interests and about profile fields.

20. The system of claim 9, where the predictive variables are selected from the variables consisting of: intensity of relationship, intimacy of relationship, duration of relationship, social distance, reciprocal services in common, and emotional support between the user and the connected persons.

21. The system of claim 9, where to model the tie strengths, the processor is further configured to execute the following statistical analysis:

$$s_i = \alpha + \beta R_i + \gamma D_i + N(i) + \varepsilon_i, \text{ where}$$

$$N(i) = \lambda_0 \mu_M + \sum_{k=2}^{4} \sum_{s \in M} \lambda_k (s - \mu_M)^k + \lambda_5 \min_M + \lambda_6 \max_M,$$

where $M = s_j$: j and i are mutual connected persons, and
where $s_i$ represents the tie strength of the $i^{th}$ person, $\alpha$ represents a constant determined by a standard least-squares minimization process, $R_i$ stands for a vector of a plurality of individual predictive variables, $\beta$ is a weight coefficient and $\epsilon_i$ is an error term.

22. A method of predicting tie strength between persons within a social media network, the method executed by a computer having a processor and system memory, the method comprising:
modeling, with the computer executing a model, tie strengths between a user of the social media network and connected persons linked together in the social media network as a combination of: a plurality of predictive variables, interactions between dimensions of the predictive variables, and network structure of the social media network that interlinks the connected persons;
where modeling includes:
fitting equations of the model with tie strengths between the user and the connected persons by determining weights of dimensions of the predictive variables using an iterative variation of ordinary least squares regression; and
assigning correlation statistic values to respective predictive variables that indicate an importance of respective predictive variables when in the presence of other of the predictive variables;
altering, with the computer, a stream of social media content received by the user from the connected persons using the tie strength as associated with the respective connected persons according to the modeling; and
delivering, by computer, the altered stream of social media content to a communications device of the user.

23. The method of claim 22, where the predictive variables comprise a combination of: intensity of relationship, intimacy of relationship, duration of relationship, social distance, reciprocal services in common, and emotional support between the user and the connected persons.

24. The method of claim 22, where the network structure is modeled using at least seven descriptors of tie strength distribution over mutually connected persons comprising: mean; median; variance; skew; kurtosis; minimum; and maximum.

25. The method of claim 22, where the tie strength between the user and each connected person comprises strength selected from the group consisting of strong tie and weak tie along a continuum of tie strength.

26. The method of claim 22, where the tie strength associated with each of at least some of the connected persons is dependent upon tie strengths between other connected persons.

27. The method of claim 22, where the model comprises a linear or a non-linear combination of: the plurality of predictive variables, a plurality of pairwise interactions between the dimensions of the predictive variables, and the network structure of the social media network.

28. The method of claim 15, where the intensity of relationship variables are selected from the variables consisting of: wall words exchanged, user-initiated wall posts, friend-initiated wall posts, inbox messages exchanged, inbox thread depth, status updates from the user, and status updates from friends.

29. The system of claim 9, where the network structure is modeled using at least seven descriptors of tie strength distribution over mutually connected persons comprising: mean; median; variance; skew; kurtosis; minimum; and maximum.

* * * * *